United States Patent
Endoh et al.

(10) Patent No.: US 8,850,582 B2
(45) Date of Patent: Sep. 30, 2014

(54) SECURITY MONITORING SYSTEM AND SECURITY MONITORING METHOD

(71) Applicant: Hitachi, Ltd., Tokyo (JP)

(72) Inventors: Hiromichi Endoh, Hitachi (JP); Tsutomu Yamada, Hitachinaka (JP); Junya Fujita, Hitachinaka (JP); Satoshi Okubo, Kasama (JP)

(73) Assignee: Hitachi, Ltd., Tokyo (JP)

( * ) Notice: Subject to any disclaimer, the term of this patent is extended or adjusted under 35 U.S.C. 154(b) by 107 days.

(21) Appl. No.: 13/767,336

(22) Filed: Feb. 14, 2013

(65) Prior Publication Data
US 2013/0212681 A1 Aug. 15, 2013

(30) Foreign Application Priority Data

Feb. 15, 2012 (JP) ................................ 2012-030281

(51) Int. Cl.
 *G06F 11/00* (2006.01)
 *H04L 29/06* (2006.01)
(52) U.S. Cl.
 CPC .................................. *H04L 63/1416* (2013.01)
 USPC .................... 726/23; 726/22; 726/24; 726/25
(58) Field of Classification Search
 CPC ............................... G06F 21/552; G06F 21/22
 USPC ....................................................... 726/22–25
 See application file for complete search history.

(56) References Cited

U.S. PATENT DOCUMENTS

| 2007/0266434 A1* | 11/2007 | Reifer ............................ 726/22 |
| 2007/0271612 A1* | 11/2007 | Fang et al. ..................... 726/22 |
| 2008/0313738 A1* | 12/2008 | Enderby ......................... 726/24 |
| 2009/0241188 A1* | 9/2009 | Komura .......................... 726/22 |
| 2010/0046378 A1* | 2/2010 | Knapp et al. ................... 370/242 |
| 2010/0050262 A1* | 2/2010 | Knapp et al. ................... 726/25 |

(Continued)

FOREIGN PATENT DOCUMENTS

| JP | 2008-85819 A | 4/2008 |
| JP | 2009-49490 A | 3/2009 |

OTHER PUBLICATIONS

Joglekar et al. "ProtoMon: Embedded Monitors for Cryptographic Protocol Intrusion Detection and Prevention," Proceedings of the International Conference on Information Technology: Coding and Computing 2004, pp. 81-88 vol. 1.*

(Continued)

*Primary Examiner* — Luu Pham
*Assistant Examiner* — Roderick Tolentino
(74) *Attorney, Agent, or Firm* — Crowell & Moring LLP

(57) ABSTRACT

The objective of the present invention is to provide a security monitoring system and a security monitoring method which is capable of a quick operation when an unauthorized access, a malicious program, and the like are detected, while the normal operation of the control system is not interrupted by an erroneous detection. The security monitoring system 100 obtains communication packets in segments 3 which constitutes a control system 1, and extracts a communication packet which has a characteristic value different from a normal value among the obtained communication packets to generate communication event information 150. The security monitoring system 100 predicts a degree of influence on the control system 1 by the communication packet extracted as the communication event information 150 by verifying the communication event information 150 with event patterns which indicate characteristics of the unauthorized access and the like.

6 Claims, 17 Drawing Sheets

(56) References Cited

U.S. PATENT DOCUMENTS

| | | |
|---|---|---|
| 2010/0132040 A1* | 5/2010 | Bhagwat et al. ............... 726/23 |
| 2010/0154059 A1* | 6/2010 | McNamee et al. ............. 726/23 |
| 2011/0283350 A1* | 11/2011 | Brandt et al. ................. 726/13 |
| 2012/0151565 A1* | 6/2012 | Fiterman ......................... 726/7 |

OTHER PUBLICATIONS

Bhattacharya et al. "Utilizing Network Features for Privacy Violation Detection," Communication System Software and Middleware, 2006. Comsware 2006. First International Conference, pp. 1-10.*

* cited by examiner

FIG.3

150 COMMUNICATION EVENT INFORMATION

| | |
|---|---|
| 151 — HEADER | |
| 152 — MANAGEMENT INFORMATION (EVENT ID, ORIGINATION ID, GENERATION TIME) | |
| 153 — CHARACTERISTIC VALUE "1" (DESTINATION ADDRESS) | 192.168.10.1 |
| 154 — CHARACTERISTIC VALUE "2" (ORIGINATION ADDRESS) | 10.1.2.1 |
| 155 — CHARACTERISTIC VALUE "3" (DATA LENGTH) | 1000 |
| 156 — CHARACTERISTIC VALUE "4" (PROTOCOL TYPE) | FTP |
| ⋮ | ⋮ |

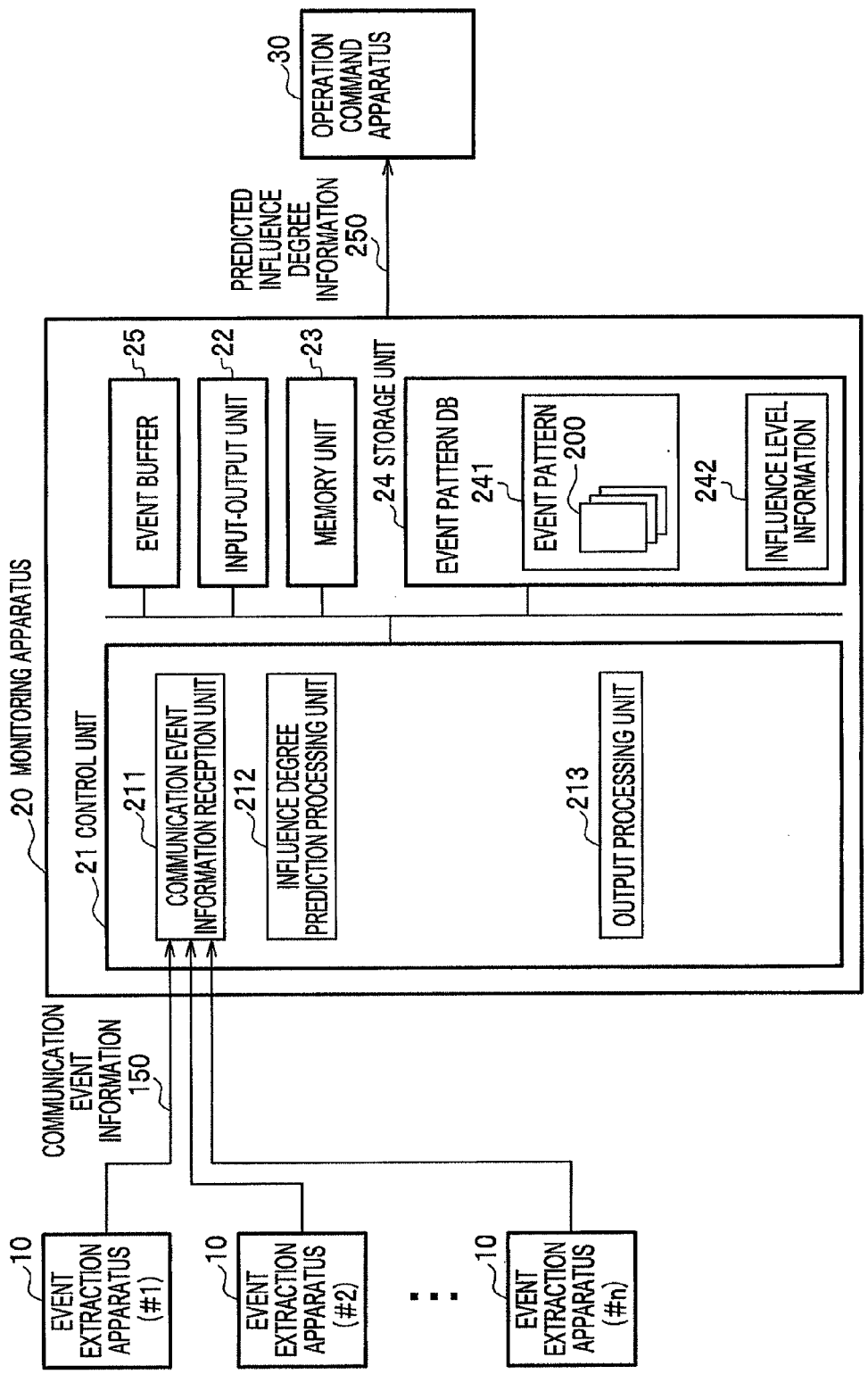

FIG.5A

200A EVENT PATTERN

| EVENT PATTERN (A-1) | CHARACTERISTIC VALUE CONDITION "1" (DESTINATION ADDRESS) | |
|---|---|---|
| | CHARACTERISTIC VALUE CONDITION "2" (ORIGINATION ADDRESS) | |
| | CHARACTERISTIC VALUE CONDITION "3" (DATA LENGTH) | |
| | CHARACTERISTIC VALUE CONDITION "4" (PROTOCOL TYPE) | |
| | REPEAT COUNT CONDITION | 201 |
| | — | |
| EVENT PATTERN (A-2) | CHARACTERISTIC VALUE CONDITION "1" (DESTINATION ADDRESS) | |
| | CHARACTERISTIC VALUE CONDITION "2" (ORIGINATION ADDRESS) | |
| | CHARACTERISTIC VALUE CONDITION "3" (DATA LENGTH) | |
| | CHARACTERISTIC VALUE CONDITION "4" (PROTOCOL TYPE) | |
| | REPEAT COUNT CONDITION | 201 |
| | TIME LAG CONDITION | 202 |
| EVENT PATTERN (A-3) | CHARACTERISTIC VALUE CONDITION "1" (DESTINATION ADDRESS) | |
| | CHARACTERISTIC VALUE CONDITION "2" (ORIGINATION ADDRESS) | |
| | CHARACTERISTIC VALUE CONDITION "3" (DATA LENGTH) | |
| | CHARACTERISTIC VALUE CONDITION "4" (PROTOCOL TYPE) | |
| | REPEAT COUNT CONDITION | 201 |
| | TIME LAG CONDITION | 202 |
| ⋮ | ⋮ | |

FIG.5B

200B EVENT PATTERN

| EVENT PATTERN (B) | CHARACTERISTIC VALUE CONDITION "1" (DESTINATION ADDRESS) | |
|---|---|---|
| | CHARACTERISTIC VALUE CONDITION "2" (ORIGINATION ADDRESS) | |
| | CHARACTERISTIC VALUE CONDITION "3" (DATA LENGTH) | |
| | CHARACTERISTIC VALUE CONDITION "4" (PROTOCOL TYPE) | |
| | REPEAT COUNT CONDITION | 201 |
| | — | |

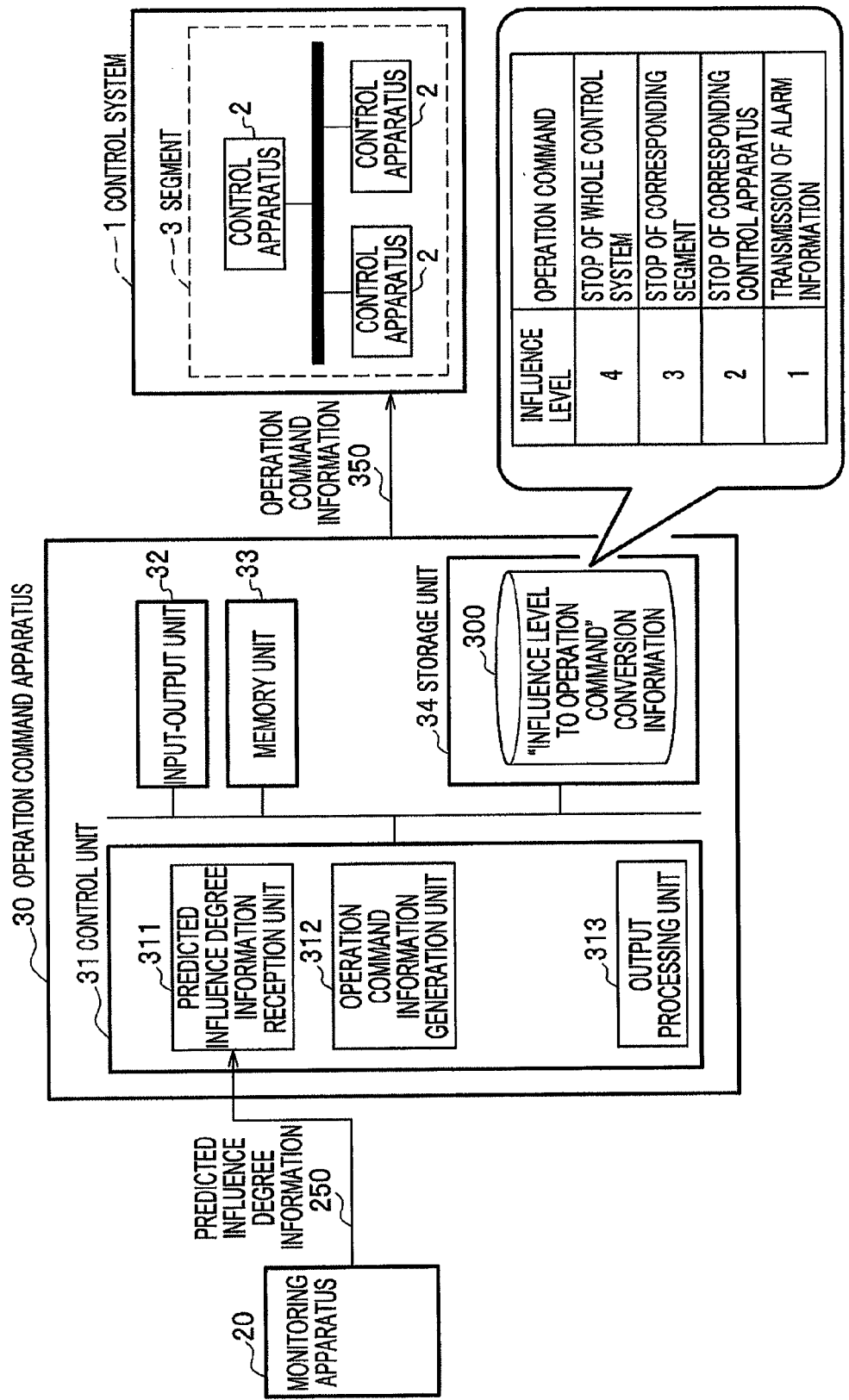

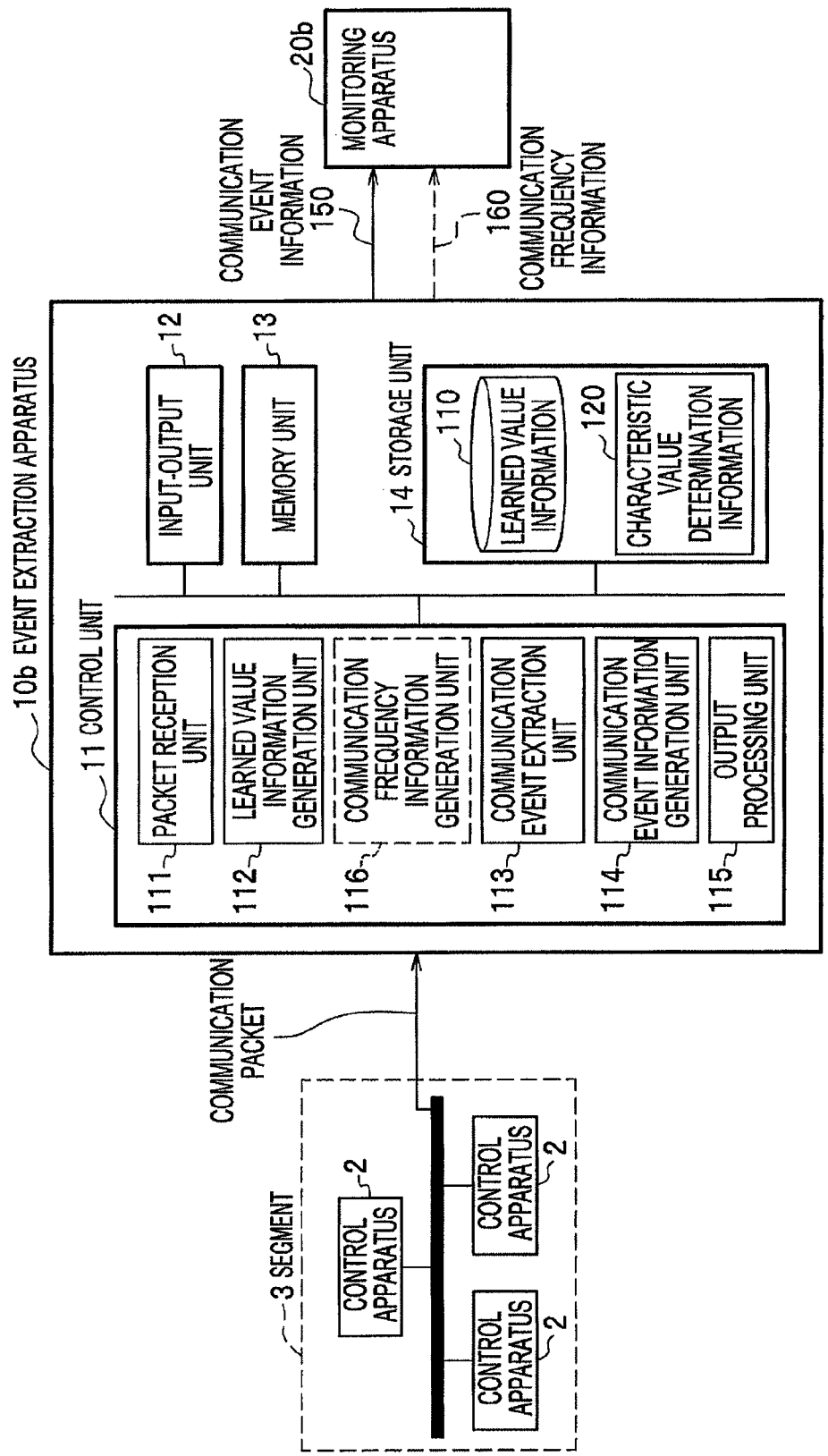

FIG.12A

160 COMMUNICATION FREQUENCY INFORMATION

| ORIGINATION \ DESTINATION | 192.168.10.1 | 192.168.10.2 | 192.168.10.3 | 192.168.20.1 |
|---|---|---|---|---|
| 192.168.10.1 | — | 1200 | 250 | 750 |
| 192.168.10.2 | 250 | — | 400 | 0 |
| 192.168.10.3 | 120 | 230 | — | 0 |
| 192.168.20.1 | 40 | 0 | 0 | — |

FIG.12B

160 COMMUNICATION FREQUENCY INFORMATION

| ORIGINATION \ DESTINATION | 192.168.10.1 | 192.168.20.1 | 192.168.20.2 |
|---|---|---|---|
| 192.168.10.1 | — | 750 | 0 |
| 192.168.20.1 | 40 | — | 160 |
| 192.168.20.2 | 0 | 200 | — |

FIG.14

160 COMMUNICATION FREQUENCY INFORMATION (WHOLE)

| ORIGINATION \ DESTINATION | 192.168.10.1 | 192.168.10.2 | 192.168.10.3 | ... | 192.168.20.1 | 192.168.20.2 | ... |
|---|---|---|---|---|---|---|---|
| 192.168.10.1 | — | 1200 | 250 | | 750 | 0 | |
| 192.168.10.2 | 250 | — | 400 | | 0 | 0 | |
| 192.168.10.3 | 120 | 230 | — | | 0 | 0 | |
| ... | 40 | 0 | 0 | — | | | |
| 192.168.20.1 | 0 | 0 | 0 | | — | 160 | |
| 192.168.20.2 | | | | | 200 | — | |
| ... | | | | | | | — |

FIG.15A

210 APPARATUS CORRELATION MAP

| DESTINATION / ORIGINATION | 192.168.10.1 | 192.168.10.2 | 192.168.10.3 | ... | 192.168.20.1 | 192.168.20.2 |
|---|---|---|---|---|---|---|
| 192.168.10.1 | — | 4 | 2 | | 3 | |
| 192.168.10.2 | 2 | — | 3 | | 0 | 0 |
| 192.168.10.3 | 2 | 2 | — | — | 0 | 0 |
| ... | | | | | | |
| 192.168.20.1 | 1 | 0 | 0 | | — | 2 |
| 192.168.20.2 | 0 | 0 | 0 | | 2 | — |

FIG.15B

| NUMBER OF PACKET | CORRELATION VALUE |
|---|---|
| 1~100 | 1 |
| 101~300 | 2 |
| 301~900 | 3 |
| 901~ | 4 |

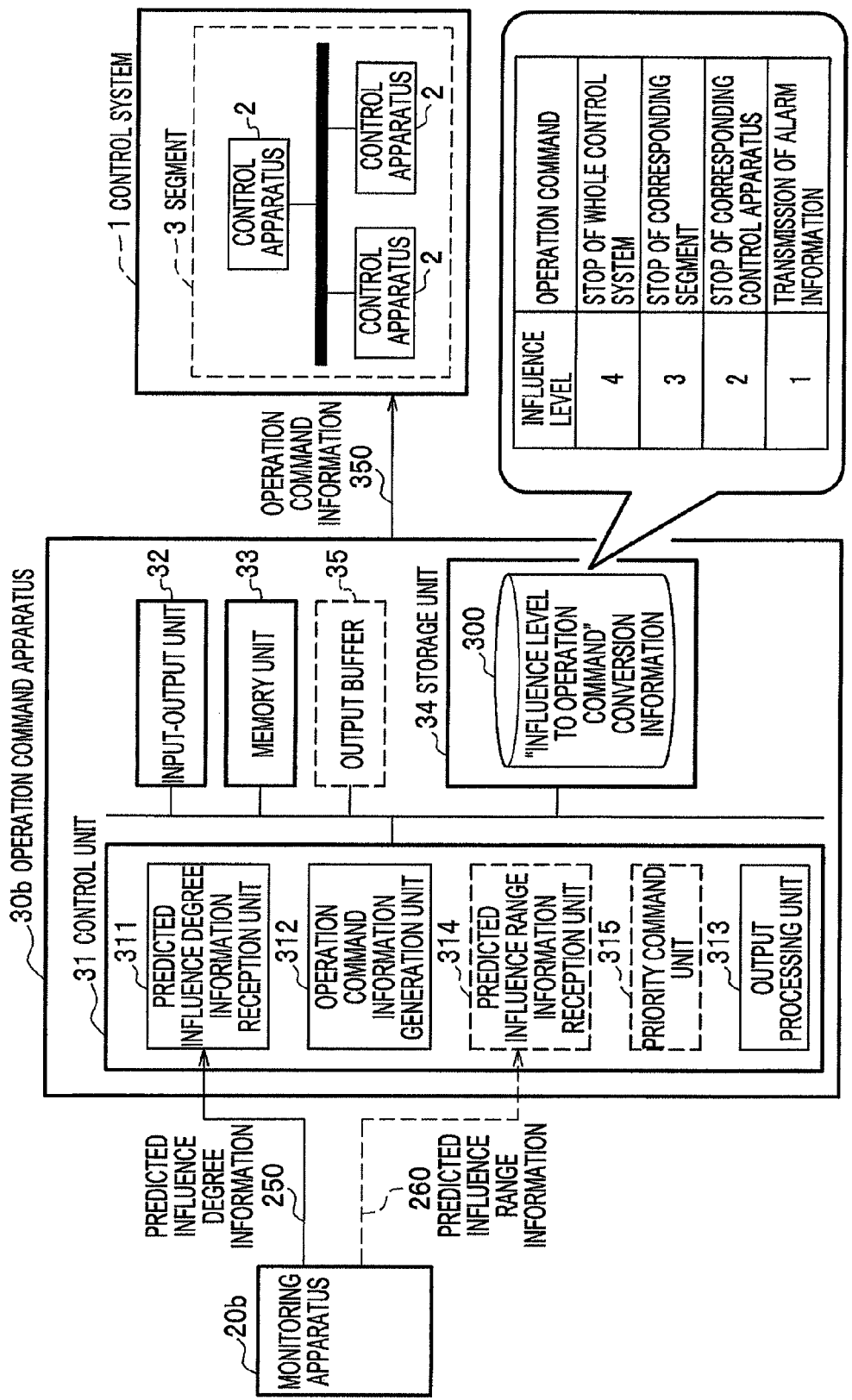

SECURITY MONITORING SYSTEM AND SECURITY MONITORING METHOD

CROSS REFERENCE TO RELATED APPLICATIONS

This application claims the foreign priority benefit under Title 35, United States Code, 119 (a)-(d) of Japanese Patent Application No. 2012-030281, filed on Feb. 15, 2012 in the Japan Patent Office, the disclosure of which is herein incorporated by reference in its entirety.

TECHNICAL FIELD

The present invention relates to, a security monitoring system and a security monitoring method, which are particularly applied to a control system used for controlling plant facilities and the like.

BACKGROUND ART

In the control system used particularly for controlling the plant facilities and the like, it may be difficult to take security measures such as anti-virus software which is commonly used, because of time constraints on executions of control operations, constraints on a processing capability of a control apparatus which constitutes the control system, and other constraints.

On the other hand, a method for detecting an abnormality in a network on the basis of statistical analysis of traffic data is disclosed in Patent Document 1 as a method for detecting an abnormal communication from communication packets which are collected on a network. In addition, a method for detecting an abnormality in a network by detecting a traffic flow which is different from what is defined in traffic rules is disclosed in Patent Document 2.

CITATION LIST

Patent Literature

{Patent Document 1}
Japanese Patent Application Publication No. 2009-049490
{Patent Document 2}
Japanese Patent Application Publication No. 2008-085819

SUMMARY OF INVENTION

Technical Problem

However, when only the method for detecting an abnormality on the basis of statistical analysis described in Patent Document 1 is applied to the security monitoring of the control system, it may not be determined whether or not a communication detected as abnormal is actually due to an unauthorized access or an activity of a malicious program. For example, a communication which is performed temporary or locally for maintenance work and the like may be erroneously detected as abnormal. If an operation such as interruption of the communication or emergency stop of the control system is taken in response to an erroneous detection, a normal operation of the control system is interrupted. On the other hand, when only the method for detecting the abnormality on the basis of rule definitions is applied to the security monitoring of the control system, a burden of the security establishment increases because an amount of rule sets to be defined increases when the size of the control system as a monitoring target increases. Some of the unauthorized accesses of a type that exploits vulnerability of software and the unauthorized accesses by spoofing are performed in accordance with a normal protocol, and not detected by verification with the rule definitions.

The present invention is devised in view of such a background, and an objective of the present invention is to provide a security monitoring system and a security monitoring method which is capable of a quick operation when an unauthorized access, a malicious program, and the like are detected, while the normal operation of the control system is not interrupted by the erroneous detection.

Solution to Problem

To solve the problems mentioned above, an aspect of a security monitoring system according to the present invention obtains communication packets in segments which constitute the control system, and extracts a communication packet which has a characteristic value different from a normal value among the obtained communication packets to generate communication event information. The security monitoring system predicts a degree of influence on the control system by the communication packet extracted as the communication event information by verifying the communication event information with event patterns which indicate characteristics of the unauthorized access and the like.

Advantageous Effects of Invention

According to the present invention, a security monitoring system and a security monitoring method can be presented, which is capable of a quick operation when an unauthorized access, a malicious program, and the like are detected, while the normal operation of the control system is not interrupted by the erroneous detection.

BRIEF DESCRIPTION OF DRAWINGS

FIG. 3 is a diagram showing an example of a data structure of communication event information according to the first embodiment of the present invention.

FIG. 4 is a functional block diagram showing a configuration example of a monitoring apparatus according to the first embodiment of the present invention.

FIG. 5A and FIG. 5B are diagrams showing examples of event patterns according to the first embodiment of the present invention.

FIG. 6 is a functional block diagram showing a configuration example of an operation command apparatus according to the first embodiment of the present invention.

FIG. 11 is a functional block diagram showing a configuration example of an event extraction apparatus according to the second embodiment of the present invention.

FIG. 12A and FIG. 12B are diagrams showing examples of data structures of communication frequency information according to the second embodiment of the present invention.

FIG. 14 is a diagram showing an example of a data structure of communication frequency information (whole) according to the second embodiment of the present invention.

FIG. 15A and FIG. 15B are diagrams for explaining an example of a data structure of an apparatus correlation map according to the second embodiment of the present invention.

FIG. 17 is a functional block diagram showing a configuration example of an operation command apparatus according to the second embodiment of the present invention.

DESCRIPTION OF EMBODIMENTS

Next, an embodiment (hereinafter, referred to as a "present embodiment") for performing the present invention will be explained in detail with appropriate reference to the accompanying drawings.

First Embodiment

First, a security monitoring system 100 according to a first embodiment of the present invention will be explained. The security monitoring system 100 according to the present invention is connected with a control system 1 which is a monitoring target, and obtains communication packets which are transmitted and received in the control system 1. When the security monitoring system 100 detects an unauthorized access, a malicious program, or the like, the security monitoring system 100 performs a process to transmit an operation command to the control system 1 in accordance with a degree of influence by the unauthorized access, the malicious program, or the like.

<Whole Configuration of Security Monitoring System>

Figure 1:
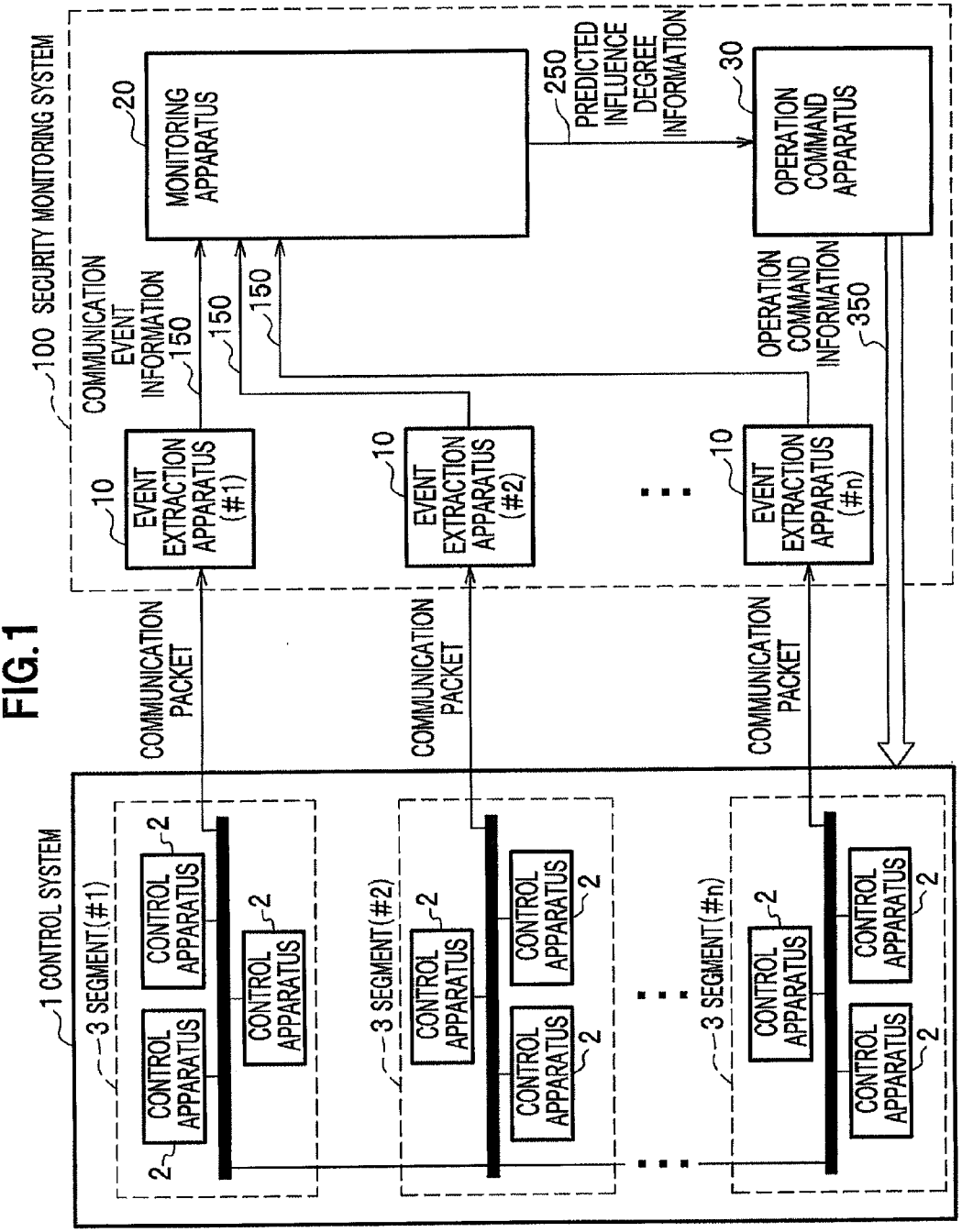
FIG. 1 is a diagram showing a whole configuration of a security monitoring system according to a first embodiment of the present invention.

FIG. 1 is a diagram showing a whole configuration of a security monitoring system according to the first embodiment of the present invention. As shown in FIG. 1, the security monitoring system 100 is respectively connected to each of segments 3 which constitute the control system 1. Here, the segment 3 means a control network which is constituted by one or more control apparatuses 2. In addition, one or more segments 3 constitute the control system 1 and are connected each other as necessary. In addition to apparatuses such as a controller and a PLC (Programmable Logic Controller) which perform actual control operations, the control apparatuses 2 include another apparatuses such as a server, an operation terminal, and a development apparatus which constitute the control system 1.

As shown in FIG. 1, the security monitoring system 100 is configured to include event extraction apparatuses 10 (#1 to #n) which are respectively provided for each of the segments 3 (#1 to #n) of the control system 1, a monitoring apparatus 20, and an operation command apparatus 30. The event extraction apparatus 10 receives the communication packets from the respectively connected segment 3 of the control system 1, and extracts communication packets which are different from communication packets normally transmitted and received, to transmit the extracted communication packets as communication event information 150 to the monitoring apparatus 20. The monitoring apparatus 20 predicts the degree of influence to the control system 1 by the unauthorized access or the like by the communication packets on the basis of the received communication event information 150, and transmits the degree of influence as predicted influence degree information 250 to the operation command apparatus 30. When the operation command apparatus 30 receives the predicted influence degree information 250, the operation command apparatus 30 transmits as operation command information 350 an operation, such as complete stop of the control system 1 or stop of the control apparatuses 2 in the segments 3, to be performed by the control system 1 to the control system 1 in accordance with a level of the degree of influence. The details of the process which each apparatus performs and the details of the information which each apparatus transmits and receives will be described later. Next, a specific configuration of each apparatus in the security monitoring system 100 will be explained.

(Event Extraction Apparatus)

Figure 2:
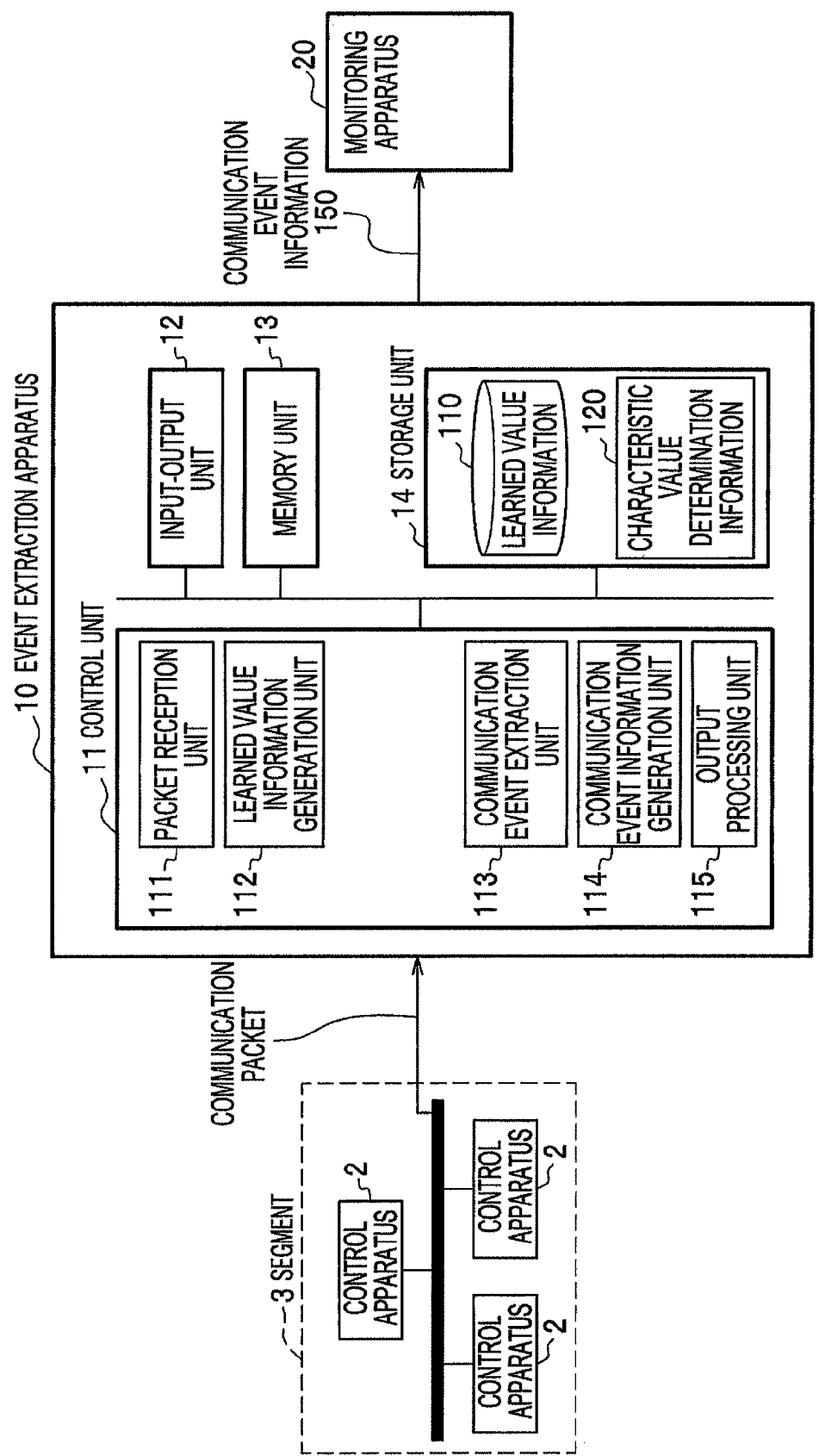
FIG. 2 is a functional block diagram showing a configuration example of an event extraction apparatus according to the first embodiment of the present invention.

FIG. 2 is a functional block diagram showing a configuration example of the event extraction apparatus according to the first embodiment of the present invention. The event extraction apparatus 10 is connected to one segment 3 in the control system 1 through a communication line. And the event extraction apparatus 10 is connected to the monitoring apparatus 20 in the security monitoring system 100. As shown in FIG. 2, the event extraction apparatus 10 is configured to include a control unit 11, an input-output unit 12, a memory unit 13, and a storage unit 14. The event extraction apparatus 10 receives the communication packets from the segment 3, and extracts communication packets which are different from the communication packets normally transmitted and received, to transmit the extracted communication packet as the communication event information 150 to the monitoring apparatus 20.

The control unit 11 controls overall processes which are performed by the event extraction apparatus 10, and is configured to include a packet reception unit 111, a learned value information generation unit 112, a communication event extraction unit 113, a communication event information generation unit 114, and an output processing unit 115.

The packet reception unit 111 receives the communication packets from the segment 3 through the input-output unit 12.

The learned value information generation unit 112 obtains the communication packets from the packet reception unit 111, and extracts characteristic values which are common information included in the obtained communication packets, for example, destination address, origination address, data length, and protocol type, to generate sample data during normal operation. The learned value information generation unit 112 processes the sample data during normal operation by a predetermined learning algorithm, and stores the processed results as learned value information 110 in the storage unit 14. Algorithms such as support vector machine and vector quantization clustering are used as the predetermined learning algorithm. The generation process of the learned value information 110 is performed in advance, before the monitoring for the unauthorized access, the malicious program, and the like on the control system 1 is performed by the security monitoring system 100. For example, the generation process of the learned value information 110 is performed at a stage where communication trends can be obtained during normal operation in test operations or the like before actual operation of the control system 1. The learned value information generation unit 112 learns the characteristic values of the communication packets of the control system 1 during normal operation in the generation process of the learned value information 110. The details of the generation process (the learned value information generation process) of the learned value information 110 will be explained later with reference to FIG. 7.

The communication event extraction unit 113 obtains the communication packets from the packet reception unit 111, and extracts a characteristic value which is information commonly attached to the obtained communication packets, to determine whether or not the characteristic value is different from a normal value by verifying the characteristic value with a characteristic value determination information 120 which is set on the basis of the learned value information 110. The communication event extraction unit 113 extracts a communication packet including the characteristic value which has been determined that the characteristic value is different from the normal value. As the characteristic values, for example, destination address, origination address, data length, and protocol type are used.

Conditions for each characteristic value for determining that the communication packet is different from a normal packet are set in advance, before the monitoring for the unauthorized access and the like is performed, to the characteristic value determination information 120 by an administrator or the like of the security monitoring system 100, on the basis of the learned value information 110 which has been generated by the learned value information generation unit 112. The learned value information generation unit 112 stores the characteristic value determination information 120 in the storage unit 14.

The communication event extraction unit 113 determines whether or not each characteristic value extracted from the communication packet is different from the normal value on the basis of the conditions set for each characteristic value included in the characteristic value determination information 120 which is set based on the learned value information 110.

For example, when the characteristic value is the destination address, the communication event extraction unit 113 determines that the destination address is normal if the destination address is within a range of "192.168.xx.yy" (for example, "192.168.10.1") as the condition set for the characteristic value determination information 120, because the range of addresses used in the same segment 3 is normally set in advance. On the other hand, the communication event extraction unit 113 determines that the characteristic value (the destination address) is different from the normal value based on the set condition if the destination address of the obtained communication packet is out of the range of the address. When the characteristic value is the origination address, the communication event extraction unit 113 also determines whether or not the characteristic value (the origination address) is different from the normal value, depending on whether or not the origination address is within a range of the address based on the set condition.

When the characteristic value is the data length, the communication event extraction unit 113 learns the data length of the communication packet during normal operation based on the learned value information 110 to set the learned data length as the characteristic value determination information 120 in advance, and determines that the characteristic value (the data length) is different from the normal value if the communication packet has a data length longer than a predetermined threshold value or shorter than a predetermined threshold value.

When the characteristic value is the protocol type, the communication event extraction unit 113 stores protocol types (for example, UDP (User Datagram Protocol), TCP (Transmission Control Protocol)) which are normally used as a condition set for the characteristic value determination information 120 based on the learned value information 110, and determines that the characteristic value (protocol type) is different from the normal value if the communication packet has a protocol type (for example, FTP (File Transfer Protocol), TELNET) which is different from the normal protocol type stored as the set condition.

The communication event information generation unit 114 generates the communication event information 150 for the communication packet including the characteristic value which is different from the normal value and is extracted by the communication event extraction unit 113. The communication event information generation unit 114 transmits the communication event information 150 to the monitoring apparatus 20 through the output processing unit 115.

FIG. 3 is a diagram showing an example of a data structure of the communication event information 150 according to the first embodiment of the present invention. As shown in FIG. 3, the communication event information 150 is configured to include a header 151, management information 152, and characteristic values 153 to 156. The header 151 has information indicating that this information is the communication event information 150. The management information 152 has an event ID (Identification), an origination ID, and a generation time which are set by the communication event information generation unit 114. Here, the event ID is a specific ID to a communication event. The origination ID is a specific ID to the event extraction apparatus 10 which has generated the communication event information 150. The generation time indicates the time when the communication event information 150 has been generated by the communication event information generation unit 114. In the characteristic values 153 to 156, for example, characteristic value "1" (destination address) 153, characteristic value "2" (origination address) 154, characteristic value "3" (data length) 155, and characteristic value "4" (protocol type) 156 are described as information of each characteristic value which has been extracted from the communication packet by the communication event extraction unit 113. In this manner, the communication event information 150 has information of each characteristic value which has been extracted and determined by the communication event extraction unit 113. It should be noted that the communication event information 150 has at least one characteristic value which has been determined that the value is different from the normal value among the characteristic values, because the communication event information generation unit 114 generates the communication event information 150 for the communication packet which includes a characteristic value different from the normal value.

Returning to FIG. 2, the output processing unit 115 outputs the communication event information 150 (see FIG. 3), which has been generated by the communication event information generation unit 114, to the monitoring apparatus 20 through the input-output unit 12.

The input-output unit 12 is constituted by communication interfaces for transmitting and receiving information to and from other apparatuses, and input-output interfaces for transmitting and receiving information to and from output apparatuses such as monitors and input apparatuses such as keyboards.

The memory unit 13 is made of a primary memory device such as a RAM (Random Access Memory), and temporarily stores information which is necessary for the processing of the control unit 11.

The storage unit 14 is made of storage media such as a HDD (Hard Disk Drive) and a flush memory. The storage unit 14 stores the learned value information 110 and the characteristic value determination information 120. As described above, the set condition for determining whether or not each characteristic value is different from the normal value by the communication event extraction unit 113 is set to the characteristic value determination information 120 by the administrator or the like, on the basis of the learned value information 110.

The control unit 11 is implemented by a program execution process by a CPU (Central Processing Unit, not shown) which is provided in the event extraction apparatus 10, or is implemented by dedicated circuits and the like. When the function of the control unit 11 is implemented by the program execution process, the storage unit 14 stores the program which is read out and executed by the CPU.

(Monitoring Apparatus)

FIG. 4 is a functional block diagram showing a configuration example of the monitoring apparatus 20 according to the first embodiment of the present invention. The monitoring apparatus 20 is connected to each of the event extraction apparatuses 10 (#1 to #n) and the operation command apparatus 30 through communication lines. As shown in FIG. 4, the monitoring apparatus 20 is configured to include a control unit 21, an input-output unit 22, a memory unit 23, a storage unit 24, and an event buffer 25. The monitoring apparatus 20 predicts the degree of influence by the unauthorized access and the like by the communication packet to the control system 1 on the basis of the communication event information 150 which has been received from the event extraction apparatus 10, and transmits the degree of influence as the predicted influence degree information 250 to the operation command apparatus 30.

The control unit controls overall processes which are performed by the monitoring apparatus 20, and is configured to include a communication event information reception unit 211, an influence degree prediction processing unit 212, and an output processing unit 213.

The communication event information reception unit 211 obtains the communication event information 150 through the input-output unit 22, and stores the information in the event buffer 25. Here, the event buffer 25 is a storage unit which stores the communication event information 150. The communication event information 150 which is inputted to the event buffer 25 is stored, for example, in the order of input time for each of the event extraction apparatuses 10 (#1 to #n) which have outputted the communication event information 150, and is saved as an input history, so that the communication event information 150 can be used easily for an influence degree prediction process which will be described later. The communication event information reception unit 211 may delete the saved communication event information 150 from the event buffer 25, when new communication event information 150 is not inputted in a predetermined time since the communication event information 150 has been saved in the event buffer 25.

The influence degree prediction processing unit 212 performs the influence degree prediction process which will be explained hereinafter, and transmits the predicted influence degree information 250, which has been generated as a processing result, to the operation command apparatus 30 through the output processing unit 213. To explain specifically, the influence degree prediction processing unit 212 monitors that the communication event information reception unit 211 stores the communication event information 150 in the event buffer 25. When the influence degree prediction processing unit 212 detects that the communication event information 150 is inputted to the event buffer 25, the influence degree prediction processing unit 212 obtains the input history including the communication event information 150 which has been inputted to the event buffer 25. The influence degree prediction processing unit 212 obtains the input history of the communication event information 150 which has been generated by the communication packet from the event extraction apparatus 10 having the same origination ID, i.e., the same segment 3, with reference to the origination ID which is attached as the management information 152 to the communication event information 150 which has been inputted to the event buffer 25.

Next, the influence degree prediction processing unit 212 verifies the obtained input history with each event pattern 200 stored in an event pattern DB (Database) 241 in the storage unit 24, and evaluates that a event pattern 200 similar to the input history is detected when a degree of similarity between the input history and the event pattern 200 exceeds a predetermined threshold value. Here, the event pattern 200 means information which is associated with a series of the communication packets and is combined with a condition which characterizes each communication packet constituting a series of the unauthorized communication packets for each unauthorized access which disturbs a normal processing by transmitting the series of unauthorized communication packets. More specifically, the event pattern 200 will be explained in FIGS. 5A, 5B below.

FIG. 5A and FIG. 5B are diagrams showing examples of the event patterns 200 according to the first embodiment of the present invention. FIG. 5A is an example of an event pattern 200A which indicates an unauthorized access of attacking by a processing procedure using the plurality of communication packets. FIG. 5B is an example of an event pattern 200B which indicates an unauthorized access of a type that is so-called DoS (Denial of Service) attack which puts a heavy load on a server by transmitting a large amount of meaningless data to the server.

FIG. 5A means that the event pattern 200A transmits as a first communication packet a communication packet having a characteristic event pattern (A-1) which is an element shown as a first event pattern in the event pattern 200A, and transmits as a second communication packet a communication packet having a characteristic event pattern (A-2). In this manner, the unauthorized access or the like is realized generally by transmitting the plurality of communication packets. Therefore, a characteristic value (for example, a destination address, an origination address, a data length, and a protocol type) of each communication packet which is transmitted with the event pattern 200A of the unauthorized access is verified with a condition which is set in a transmission sequence. Here, as the condition of the characteristic value, for example, characteristic value condition "1" (destination address), characteristic value condition "2" (origination address), characteristic value condition "3" (data length), and characteristic value condition "4" (protocol type) are set. The following conditions other than the characteristic value conditions can be set for the event pattern 200. For example, a repeat count condition 201 can be set for the event pattern 200A of this type, because a process that repeatedly transmits the communication packets of the same kind may be performed. In addition, a time lag condition 202 can be also set for the event pattern 200A, because the second and subsequent communication packets may have characteristics for the time (the transmission interval) from the transmission of the first communication packet.

For the characteristic value conditions, a range of each characteristic value is set as a predetermined condition, the characteristic values being, for example, the destination address, the origination address, the data length, and the protocol type which are used by the communication packets of the unauthorized access or the like which is indicated by the event pattern 200. For example, a condition for determining that the communication packet is transmitted by the unauthorized access or the malicious program in the event pattern (A-1) corresponding to the first packet of the event pattern 200A is set that the characteristic value condition "1" (destination address) is out of the range of "192.168.xx.yy" which is a destination address normally used. As for the characteristic value condition "2" (origination address), the condition for determining that the communication packet is transmitted by the unauthorized access or the malicious program is similarly set that the characteristic value condition "2" (origination address) is out of the range of "192.168.xx.yy". As for the characteristic value condition "3" (data length), for example, the data length exceeding a predetermined threshold value is set on the basis of the characteristics of the communication packets by the unauthorized access or the like. As for the characteristic value condition "4" (protocol type), the protocol type (can be plural) used by the unauthorized access or the like is set.

The influence degree prediction processing unit 212 verifies the communication event information 150 newly inputted, in the order indicated in the input history, with the corresponding element (one of event patterns (A-1) to (A-m)) of the event pattern 200. For example, the influence degree prediction processing unit 212 verifies the communication event information 150 which is inputted firstly with the event pattern (A-1). The influence degree prediction processing unit 212 verifies the communication event information 150 which is inputted secondly with the event pattern (A-2). Here, the influence degree prediction processing unit 212 determines that the verification of the communication event information 150 with each of the event patterns (A-1) to (A-m) is matched when all conditions set in each of the event patterns (A-1) to (A-m) are satisfied. When the verification for the set event patterns (A-1) to (A-m) is finished, the influence degree prediction processing unit 212 calculates a degree of similarity which indicates how many event patterns are matched with the corresponding communication event information 150 among m pieces of the event patterns. For example, the degree of similarity may be "1" when it is determined that all of the verifications of the event patterns (A-1) to (A-m) with the communication event information 150 are matched, and the degree of similarity may be "0.5" when it is determined that half of the verifications with the communication event information 150 are matched. The influence degree prediction processing unit 212 evaluates that the communication packets are the unauthorized access by the event pattern 200A, when the calculated degree of similarity exceeds a predetermined threshold value. When the plural event patterns 200 which exceed the predetermined threshold value are detected, the influence degree prediction processing unit 212 may adopt the event pattern 200 which has the highest degree of similarity among the detected event patterns 200.

The event pattern 200B of FIG. 5B indicates a condition of the event pattern 200 when the communication packets of the same kind are transmitted to a target like a DoS attack, and is set with the repeat count condition 201 as well as the characteristic value conditions. The influence degree prediction processing unit 212 evaluates that the communication packets are the DoS attack by the event pattern 200B, if the number of the communication event information 150 which is matched with each characteristic value condition of the event pattern 200B exceeds the count which is set to the repeat count condition 201.

Subsequently, the influence degree prediction processing unit 212 determines an influence level of the event pattern 200 with reference to influence level information 242 stored in the storage unit 24 when a similar event pattern 200 is detected. Here, the influence level is intended to indicate a level of the degree of influence on the control system 1. For example, the influence levels of four steps "4" to "1" are set to the influence level information 242 in descending order of the influence (the risk) for the control system 1, in association with the event pattern 200 which indicates the unauthorized access, the malicious program, or the like. Even if the similar event pattern 200 is not detected, the influence degree prediction processing unit 212 may determine that the influence level is the lowest influence level. In addition, the influence degree prediction processing unit 212 may adopt as the influence level of the event pattern the product of the influence level, which is obtained with reference to the influence level information 242, multiplied by the degree of similarity. The influence degree prediction processing unit 212 generates the predicted influence degree information 250 including the information of the influence level, and transmits the predicted influence degree information 250 to the operation command apparatus 30 through the output processing unit 213.

The output processing unit 213 outputs the predicted influence degree information 250 which is generated by the influence degree prediction processing unit 212 to the operation command apparatus 30 through the input-output unit 22.

The input-output unit 22 is constituted by communication interfaces for transmitting and receiving information to and from other apparatuses, and input-output interfaces for transmitting and receiving information to and from output apparatuses such as monitors and input apparatuses such as keyboards.

The memory unit 23 is made of a primary memory device such as a RAM, and temporarily stores information which is necessary for the processing of the control unit 21.

The storage unit 24 is made of a memory medium such as a HDD and a flush memory. The storage unit 24 stores an event pattern DB 241 which stores each event pattern 200 (see FIGS. 5A, 5B) described above and the influence level information 242 which includes the influence levels corresponding to each event pattern 200.

The event buffer 25 is made of a memory medium such as a RAM, and stores therein the above communication event information 150 as the input history for each event extraction apparatus 10.

The control unit 21 is implemented by a program execution process by a CPU (not shown) which is provided in the monitoring apparatus 20, or is implemented by dedicated circuits and the like. When the control unit 21 is implemented by the program execution process, the storage unit 24 stores the program which is read out and executed by the CPU.

(Operation Command Apparatus)

FIG. 6 is a functional block diagram showing a configuration example of the operation command apparatus 30 according to the first embodiment of the present invention. The operation command apparatus 30 is connected to the monitoring system 20 and each control apparatus 2 in the control system 1 through the communication lines.

As shown in FIG. 6, the operation command apparatus 30 is configured to include a control unit 31, an input-output unit 32, a memory unit 33, and a storage unit 34. The operation command apparatus 30 transmits an operation which each control apparatus 2 in the control system 1 should take as the operation command information 350 to the control system 1, in accordance with the influence level attached to the predicted influence degree information 250 which is received from the monitoring apparatus 20.

The control unit 31 controls overall processes which are performed by the operation command apparatus 30, and is configured to include a predicted influence degree information reception unit 311, an operation command information generation unit 312, and an output processing unit 313.

The predicted influence degree information reception unit 311 receives the predicted influence degree information 250 from the monitoring apparatus 20 through the input-output unit 33.

The operation command information generation unit 312 obtains the predicted influence degree information 250 from the predicted influence degree information reception unit 311. The operation command information generation unit 312 determines an operation command with reference to "influence level to operation command" conversion information 300 in the storage unit 34, on the basis of the influence level which is attached to the predicted influence degree information 250.

As shown in FIG. 6, in the "influence level to operation command" conversion information 300, the operation command is set corresponding to the influence level in advance by the administrator or the like. For example, when the influence level is "4", the operation command is set to stop the whole control system 1 as the unauthorized access or the like has very high risk. When the influence level is "3", the operation command is set to stop the corresponding segment 3 (all the control apparatuses 2 in the corresponding segment 3). When the influence level is "2", the operation command is set to stop the corresponding control apparatus 2. When the influence level is "1", the operation command is set to transmit alarm information to the control system 1. The operation command information generation unit 312 determines the corresponding segment 3, the corresponding control apparatus 2, or the like, with reference to the "influence level to operation command" conversion information 300, and generates the operation command information 350 based on the operation command.

The output processing unit 313 outputs the operation command information 350 generated by the operation command information generation unit 312 to the corresponding control apparatus 2 in the control system 1 through the input-output unit 32. At this time, the output processing unit 313 may broadcast the operation command information 350 to all the control apparatuses 2 in the control system 1 or may output the content of the operation command, which is customized by taking into account, for example, a type, a function, and other attributes of the unauthorized access or the malicious program as the influence on the control system 1, to all or a part of the control apparatuses 2 in the segment 3. In this case, the monitoring apparatus 20 may transmit the predicted influence degree information 250 by attaching the unique ID for the event pattern 200 thereto, so that the output processing unit 313 of the operation command apparatus 30 can customize the destination or the contents of the operation command information 350 on the basis of the characteristics of the unauthorized access or the like which is indicated by the event pattern 200. In addition, the output processing unit 313 may transmit the operation command information 350 which restricts the communication (transmission prohibited, receive only) for the control apparatuses 2 in a segment 3.

The input-output unit 32 is constituted by communication interfaces for transmitting and receiving information to and from other apparatuses, and input-output interfaces for transmitting and receiving information to and from output apparatuses such as monitors and input apparatuses such as keyboards.

The memory unit 33 is made of a primary memory device such as a RAM, and temporarily stores information which is necessary for the processing of the control unit 31.

The storage unit 34 is made of a memory medium such as a HDD and a flush memory. The storage unit 34 stores the "influence level to operation command" conversion information 300.

The control unit 31 is implemented by a program execution process by a CPU (not shown) which is provided in the operation command apparatus 30, and is implemented by dedicated circuits and the like. When the control unit 31 is implemented by the program execution process, the storage unit 34 stores the program which is read out and executed by the CPU.

<Method of Process>

Next, a flow of a process which is performed by the security monitoring system 100 according to the first embodiment of the present invention will be explained in detail. The overall process which is performed by the security monitoring system 100 will be explained at first, then the learned value information generation process and a communication event information generation process which are performed by the event extraction apparatus 10 constituting the security monitoring system 100, and an influence level determination process performed by the monitoring apparatus 20 will be explained in detail.

(Flow of Overall Process)

The flow of the overall process is explained mainly with reference to FIG. 1. As shown in FIG. 1, each event extraction apparatus 10 of the security monitoring system 100 receives the communication packets from the corresponding segment 3 of the control system 1. The event extraction apparatus 10 extracts a communication packet which has characteristic values different from the normal values, on the basis of the characteristic value determination information 120 which is set by using the learned value information 110 (see FIG. 2) which has been generated in advance. The event extraction apparatus 10 generates (by the communication event information generation process) the communication event information 150 (see FIG. 3) and transmits the communication event information 150 to the monitoring apparatus 20 (see FIG. 1, FIG. 2). Next, the monitoring apparatus 20 verifies the input history including the received communication event information 150 with each event pattern 200 (FIG. 5) stored in the event pattern DB 241 (see FIG. 4). The monitoring apparatus 20 determines (by the influence level determination process) an influence level of the event pattern 200 to the control system 1 with reference to the influence level information 242 (see FIG. 4), when an event pattern 200 similar to the communication event information 150 is detected. The monitoring apparatus 20 generates the predicted influence degree information 250 attached with the influence level information and transmits the predicted influence degree information 250 to the operation command apparatus 30 (see FIG. 1, FIG. 4). When the operation command apparatus 30 receives the predicted influence degree information 250, the operation command apparatus 30 transmits as the operation command information 350 to the control system 1 (see FIG. 1, FIG. 6) the operation (stop of the control system 1, or the like) which should be taken in the control system 1 in accordance with the influence level, with reference to the "influence level to operation command" conversion information 300 (see FIG. 6).

(Learned Value Information Generation Process by the Event Extraction Apparatus)

Figure 7:
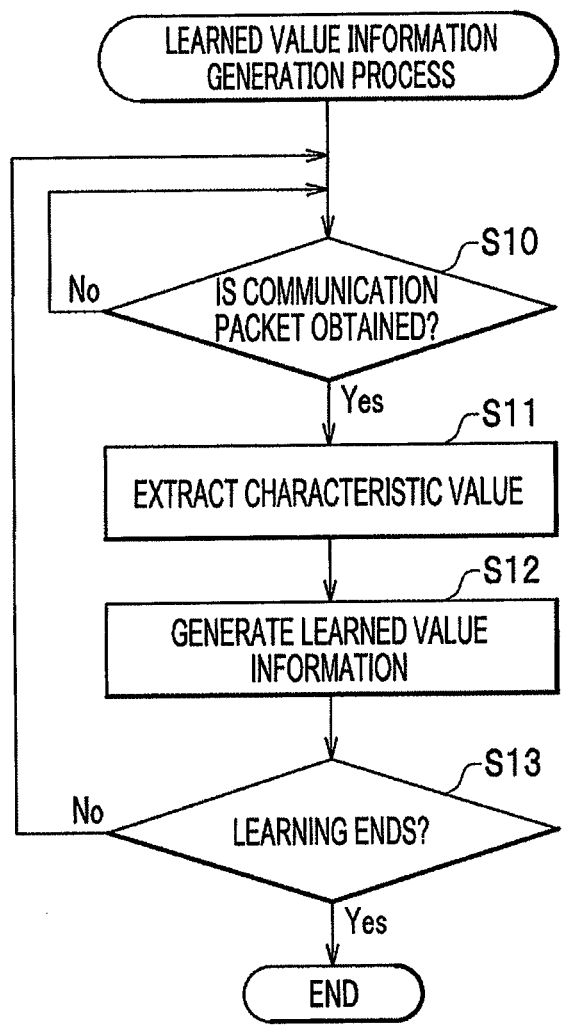
FIG. 7 is a flow chart showing a flow of a learned value information generation process performed by the event extraction apparatus according to the first embodiment of the present invention.

Next, the learned value information generation process which is performed by the learned value information generation unit 112 (see FIG. 2) of the event extraction apparatus 10 is explained with reference to FIG. 7. FIG. 7 is a flow chart showing a flow of the learned value information generation process performed by the event extraction apparatus 10 according to the first embodiment of the present invention. The learned value information generation unit 112 generates the learned value information 110 by performing in advance the learned value information generation process, before the security monitoring system 100 performs the monitoring on the unauthorized access and the like of the control system 1. The characteristic value determination information 120 is set by the administrator or the like, on the basis of the generated learned value information 110.

As shown in FIG. 7, the learned value information generation unit 112 of the event extraction apparatus 10 determines at first whether or not the learned value information generation unit 112 obtains the communication packet through the packet reception unit 111 which receives the communication packets in the segment 3 (Step S10). If the learned value information generation unit 112 does not receive the communication packet ("No" in Step S10), the process waits until the learned value information generation unit 112 obtains the communication packet. On the other hand, if the learned value information generation unit 112 receives the communication packet ("Yes" in Step S10), the process goes to Step S11. It should be noted that the process obtaining the communication packets is performed, for example, before full-scale operation of the control system 1, and collects the communication packets in a state of normal operation by performing communication which simulates the normal operation.

The learned value information generation unit 112 extracts the characteristic value which is included in the obtained communication packet (Step S11). The characteristic value is, for example, information such as a destination address, an origination address, a data length, and a protocol type.

Subsequently, the learned value information generation unit 112 processes information of each extracted characteristic value by a predetermined learning algorithm to generate the learned value information 110 (Step S12), and stores the learned value information 110 in the storage unit 14. Algorithms such as support vector machine and vector quantization clustering are used as the predetermined learning algorithm.

The learned value information generation unit 112 determines whether or not the learning ends (Step S13). The determination, whether or not the learning ends, is determined by whether or not enough communication packets have been processed to obtain data for a predetermined operation mode in the control system 1. For example, the learned value information generation unit 112 may determine that the learned value information generation unit 112 has processed sufficiently the communication packets related to the predetermined operation mode, when the number of the processed communication packets exceeds a predetermined threshold. The learned value information generation unit 112 may determine that the communication packets have been processed sufficiently, when the learned value information generation unit 112 has processed the communication packets from the start to the end of a series of processes in the predetermined operation mode. The learned value information generation unit 112 may determine that the communication packets have been processed sufficiently, when the learned value information generation unit 112 has repeated a series of processes a predetermined number of times. The administrator sets a determination condition to recognize that information of the communication packets which are transmitted and received during normal operation have been collected sufficiently for the operation mode of the control system 1. If the learned value information generation unit 112 determines that the learning does not end ("No" in Step S13), the process returns to Step S10 and continues. On the other hand, if the learned value information generation unit 112 determines that the learning ends ("Yes" in Step S13), the learned value information generation process ends.

(Communication Event Information Generation Process by the Event Extraction Apparatus)

Figure 8:
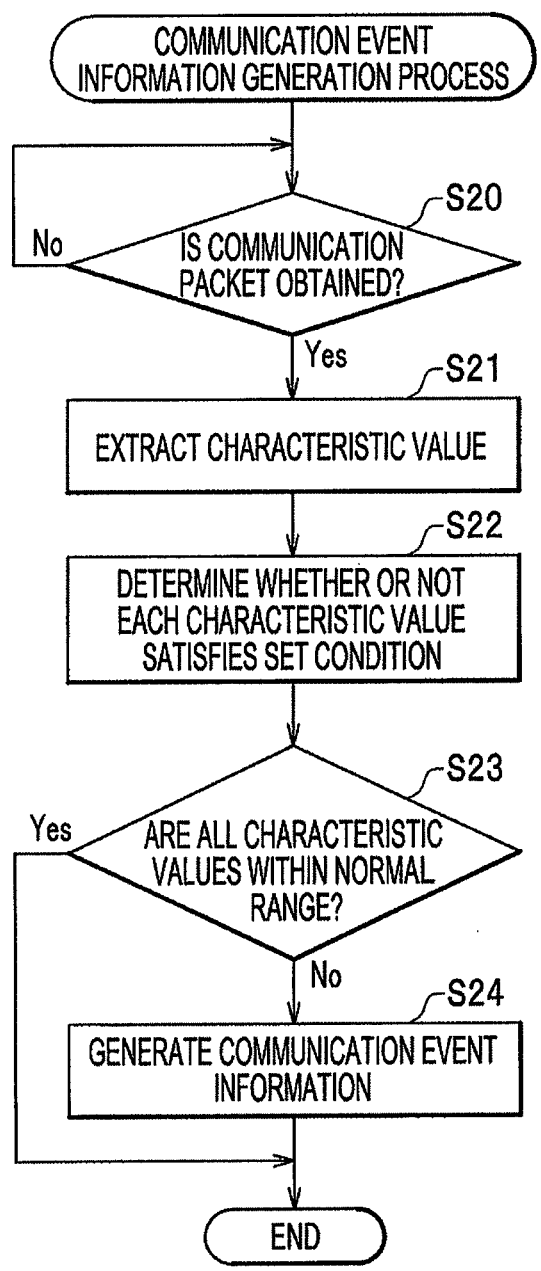
FIG. 8 is a flow chart showing a flow of a communication event information generation process performed by the event extraction apparatus according to the first embodiment of the present invention.

Next, the communication event information generation process which is performed by the communication event extraction unit 113 and the communication event information generation unit 114 (see FIG. 2) of the event extraction apparatus 10 is explained with reference to FIG. 8. FIG. 8 is a flow chart showing a flow of the communication event information generation process performed by the event extraction apparatus 10 according to the first embodiment of the present invention. The communication event information generation process is a process which is performed during operation (while monitoring the unauthorized access and the like during full-scale operation) of the control system 1.

As shown in FIG. 8, the communication event extraction unit 113 of the event extraction apparatus 10 determines at first whether or not the communication event extraction unit 113 obtains the communication packet through the packet reception unit 111 which receives the communication packets in the segment 3 (Step S20). If the communication event extraction unit 113 does not receive the communication packet ("No" in Step S20), the process waits until the communication event extraction unit 113 obtains the communication packet. On the other hand, if the communication event extraction unit 113 receives the communication packet ("Yes" in Step S20), the process goes to Step S21.

Next, the communication event extraction unit 113 extracts the characteristic values contained in the obtained communication packet (Step S21). The characteristic values are, for example, information of the destination address, the origination address, the data length, and the protocol type, similar to the characteristic values which are extracted from the communication packets in the learned value information generation process by the learned value information generation unit 112.

Subsequently, the communication event extraction unit 113 determines whether or not the characteristic value is different from the normal value for each of the extracted characteristic values by determining whether or not the characteristic value satisfies the condition set for each characteristic value which is stored in the characteristic value determination information 120 in the storage unit 14 (Step S22). As described above, the set condition is used to determine that the characteristic value such as a destination address and an origination address is normal value if the characteristic value is within a predetermined range of the address which is normally used, and that the characteristic value is different from the normal value if the characteristic value is out of the predetermined range of the address. The set condition is used to determine whether or not the characteristic value such as a data length is different from normal value by whether or not the data length exceeds a predetermined threshold value or is shorter than a predetermined threshold value. The set condition is used to determine that the characteristic value such as a protocol type is different from normal value if the protocol type is different from the protocol type which is set for normal use.

The communication event extraction unit 113 determines whether or not all of the characteristic values are determined to be within a normal range (Step S23). If all of the characteristic values are determined to be within a normal range ("Yes" in Step S23), the communication event information generation process ends. On the other hand, if the communication event extraction unit 113 determines that at least one of the characteristic values is different from the normal value ("No" in Step S23), the communication event extraction unit 113 outputs information of each characteristic value of the communication packet to the communication event information generation unit 114, and the process goes to Step S24.

In Step S24, the communication event information generation unit 114 generates the communication event information 150 (see FIG. 3) including each characteristic value of the communication packet which has been obtained from the communication event extraction unit 113. The communication event information generation unit 114 transmits the generated communication event information 150 to the monitoring apparatus 20 through the output processing unit 115, and the communication event information generation process ends.

In this manner, the event extraction apparatus 10 can generate the communication event information 150 for the communication packet, which is received from the segment 3 and includes at least one characteristic value different from the normal value, and can transmit the communication event information 150 to the monitoring apparatus 20.

(Influence Level Determination Process by the Monitoring Apparatus)

Figure 9:
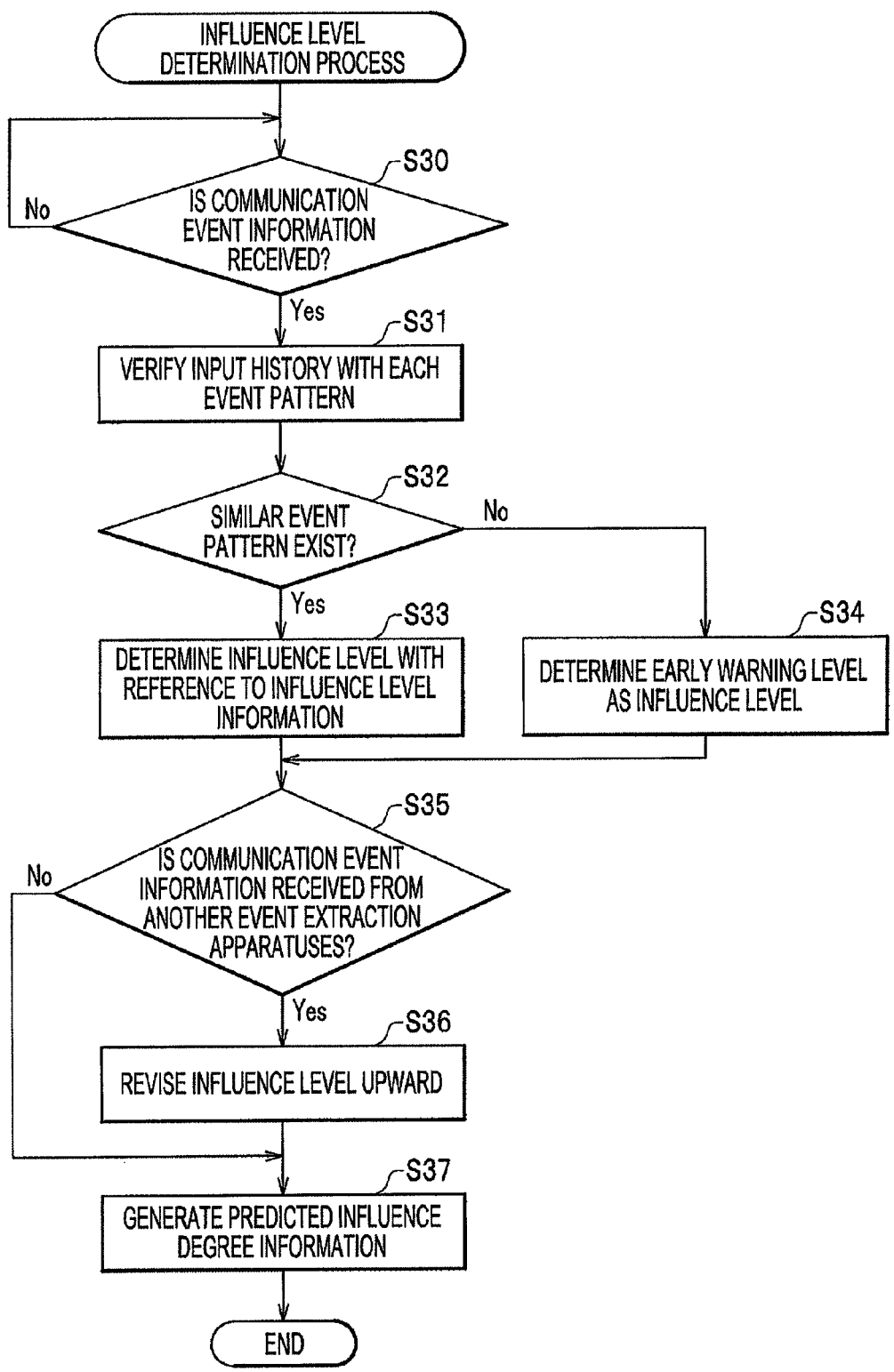
FIG. 9 is a flowchart showing a flow of an influence level determination process performed by the monitoring apparatus according to the first embodiment of the present invention.

Next, the influence level determination process which is performed by the influence degree prediction processing unit 212 (see FIG. 4) of the monitoring apparatus 20 is explained with reference to FIG. 9. FIG. 9 is a flow chart showing a flow of the influence level determination process performed by the monitoring apparatus 20 according to the first embodiment of the present invention.

As shown in FIG. 9, the influence degree prediction processing unit 212 of the monitoring apparatus 20 determines at first whether or not the communication event information reception unit 211 (see FIG. 4) receives the communication event information 150 (Step S30), by monitoring the process in which the communication event information 150 is stored in the event buffer 25. If the communication event information reception unit 211 does not receive the communication event information 150 ("No" in Step S30), the process waits until the communication event information reception unit 211 receives the communication event information 150. On the other hand, if the communication event information reception unit 211 receives the communication packet ("Yes" in Step S30), the process goes to Step S31.

In Step S31, the influence degree prediction processing unit 212 obtains from the event buffer 25 the input history including the communication event information 150 which has been received by the communication event information reception unit 211 in Step S30. The influence degree prediction processing unit 212 verifies the obtained input history of the communication event information 150 with each event pattern 200 which is stored in the event pattern DB 241 in the storage unit 24.

The influence degree prediction processing unit 212 determines whether or not the event pattern 200 similar to the input history exists (Step S32). The influence degree prediction processing unit 212 determines whether or not the input history of each segment 3 meets all the conditions such as a characteristic value condition, a repeat count condition, and a time lag condition for one of the elements (for example, the event patterns (A-1) to (A-m) in FIG. 5) of the corresponding event pattern 200 for each of the event patterns 200 shown in FIG. 5, every time one communication event information 150 is inputted. The influence degree prediction processing unit 212 calculates a degree of similarity which indicates how many communication event information 150 meet the element of the event pattern 200 among m pieces of communication event information 150 which have been verified with the element of the event pattern 200, and determines that the input history is similar to the event pattern 200 if the degree of similarity is higher than or equal to a predetermined threshold value.

Here, the influence level determination process goes to Step S33 if the influence degree prediction processing unit 212 determines that the event pattern 200 similar to the input history exists, and goes to Step S34 if the influence degree prediction processing unit 212 determines that the event pattern 200 similar to the input history does not exist.

In Step S33, the influence degree prediction processing unit 212 determines an influence level (for example, one of the influence levels "2" to "4") of the event pattern 200, which has been determined to be similar to the input history, to the control system 1 with reference to the influence level information 242 (FIG. 4). If the plurality of event patterns 200 has been determined to be similar to the input history in Step S32, the influence degree prediction processing unit 212 selects the event pattern 200 which has the degree of similarity higher than that of the other event pattern 200 as the event pattern 200 similar to the input history, and determines the influence level. Then, the process goes to Step S35.

On the other hand, if no event pattern 200 has been determined to be similar to the input history ("No" in Step S32), the influence degree prediction processing unit 212 determines an early warning level (for example, influence level "1") which is the lowest as the influence level (Step S34). Then, the process goes to Step S35.

Next, the influence degree prediction processing unit 212 determines whether other communication event information 150 has been received from another event extraction apparatuses 10 within a predetermined time from the present in the past (Step S35). If other communication event information 150 has been received from another event extraction apparatuses 10 ("Yes" in Step S35), it means that the communication packet different from communication trend during normal operation has been detected in another segments 3, and the influence degree prediction processing unit 212 determines that damage by the unauthorized access and the like is being expanded, and revises the influence level which has been determined in Steps S33 and S34 upward by one (Step S36). Then, the process goes to Step S37. On the other hand, if no other communication event information 150 has been received from another event extraction apparatuses 10 within a predetermined time in Step S35 ("No" in Step S35), the process goes to Step S37.

In Step S37, the influence degree prediction processing unit 212 generates the predicted influence degree information 250 including the determined influence level, and transmits the predicted influence degree information 250 to the operation command apparatus 30 through the output processing unit 213.

In this manner, the monitoring apparatus 20 is able to determine whether or not the input history including the communication event information 150 which is received from each event extraction apparatus 10 is similar to the event pattern 200 of the unauthorized access or the like, and can determine the influence level.

Second Embodiment

Next, a security monitoring system 100b according to a second embodiment of the present invention is explained. The security monitoring system 100b according to the second embodiment collects the communication packets which are transmitted and received in the segment 3, and predicts a spreading route of the communication event information 150 generated by the event extraction apparatus 10 with reference to the apparatus correlation map 210 (see FIGS. 15A, 15B described later) which is generated on the basis of the communication history between the control apparatuses 2. Here, the spreading route means a route of the communication packet, and the route is predicted to have high possibility to be affected by the communication packet which is generated as the next process by the control apparatus 2 which receives the communication packet when the communication packet extracted as the communication event information 150 is the unauthorized access or the like. Specifically, the spreading route is indicated by a group of control apparatuses 2 on the route of the communication packets which are transmitted and received as a process related to a series of control. The security monitoring system 100b according to the second embodiment creates the apparatus correlation map 210 (see FIGS. 15A, 15B) on the basis of the communication history of the communication packets which are transmitted and received between the control apparatuses 2 during normal operation, and determines that the possibility to be affected by the unauthorized access or the like is high if the correlation between the apparatuses is higher than a predetermined value. The security monitoring system 100b according to the second embodiment is characterized in that the security monitoring system 100b transmits the operation command information 350 on a priority basis to the control apparatuses 2 which exist on the spreading route.

<Whole Configuration of the System>

Figure 10:
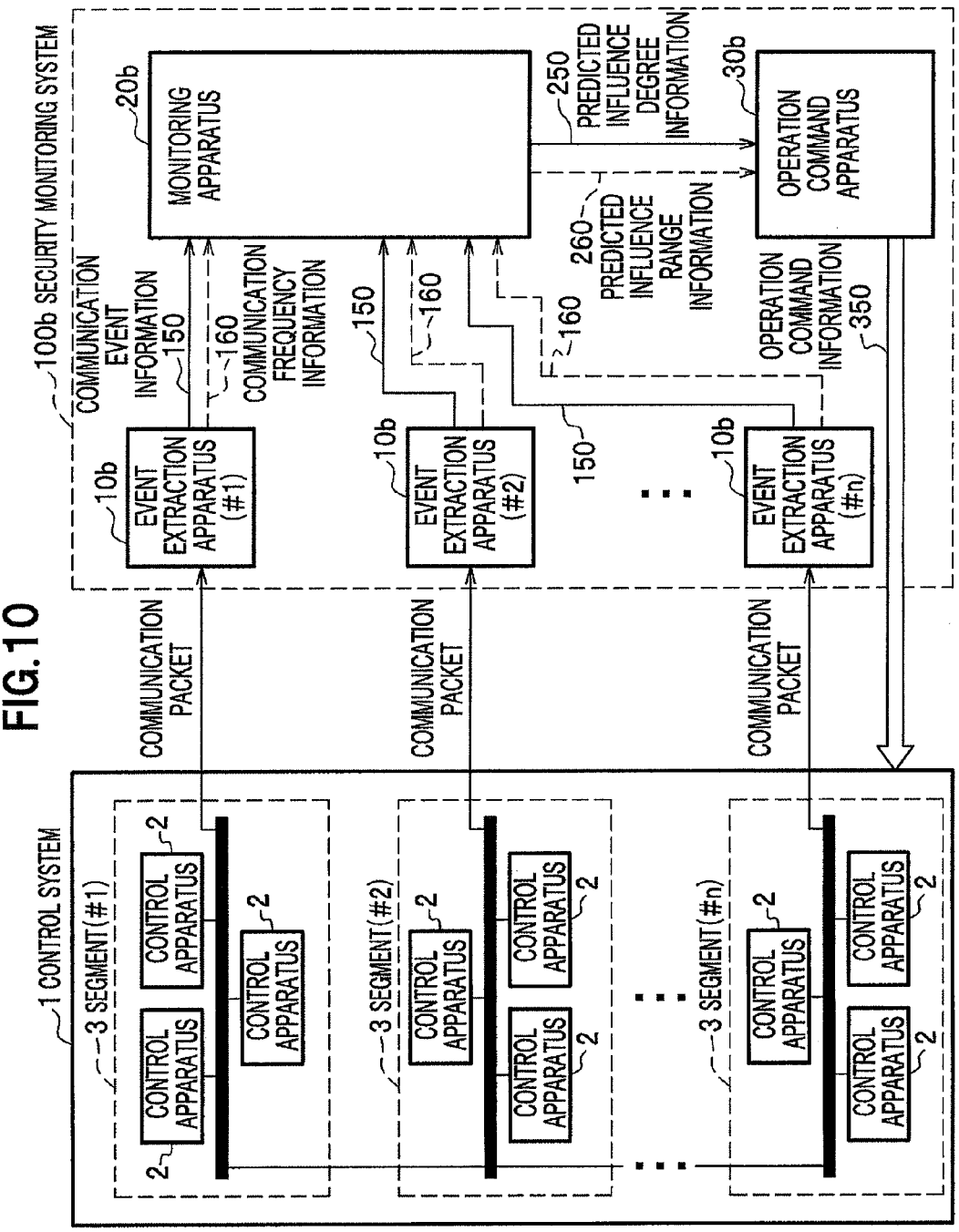
FIG. 10 is a diagram showing a whole configuration of a security monitoring system according to a second embodiment of the present invention.

FIG. 10 is a diagram showing a whole configuration of the security monitoring system 100b according to the second embodiment of the present invention. The security monitoring system 100b includes a plurality of event extraction apparatuses 10b (#1 to #n) which is respectively provided for each of the segments 3 of the control system 1, a monitoring apparatus 20b, and an operation command apparatus 30b. The difference from the security monitoring system 100 according to the first embodiment of the present invention shown in FIG. 1 is that the event extraction apparatus 10b generates the communication event information 150 as well as the communication frequency information 160 (see FIGS. 12A, 12B described later) indicating the number (the frequency) of the communication packets which are transmitted and received between the control apparatuses 2 in the segment 3, and transmits the communication frequency information 160 to the monitoring apparatus 20b. The monitoring apparatus 20b generates the apparatus correlation map 210 (see FIGS. 15A, 15B) on the basis of the communication frequency information 160 which is received from each event extraction apparatus 10b, and determines the spreading route of the communication packets which are determined to be similar to the event pattern 200 of the unauthorized access or the like, and then transmits to the operation command apparatus 30b the information indicating the control apparatuses 2 on the spreading route as predicted influence range information 260. The operation command apparatus 30b transmits the operation command information 350 on a priority basis to the control apparatuses 2 on the spreading route which is indicated by the predicted influence range information 260. Next, specific configuration of each apparatus in the security monitoring system 100b will be explained.

(Event Extraction Apparatus)

FIG. 11 is a functional block diagram showing a configuration example of the event extraction apparatus 10b according to the second embodiment of the present invention. The difference from the event extraction apparatus 10 (see FIG. 2) according to the first embodiment of the present invention is that the event extraction apparatus 10b includes a communication frequency information generation unit 116 as well as each configuration of the event extraction apparatus 10. The communication frequency information generation unit 116 counts each communication packet received from the segment 3 to generate the communication frequency information 160 (see FIGS. 12A, 12B), and transmits the communication frequency information 160 to the monitoring apparatus 20b. Since other configurations are same as the event extraction apparatus 10 shown in FIG. 2, the explanation will be omitted.

The communication frequency information generation unit 116 obtains the communication packets which are the same with each communication packet obtained when the learned value information generation unit 112 generates the learned value information 110, through the packet reception unit 111, and generates the communication frequency information 160.

FIG. 12A and FIG. 12B are diagrams showing examples of data structures of the communication frequency information 160 according to the second embodiment of the present invention. As shown in FIGS. 12A, 12B, the communication frequency information 160 is composed of a matrix corresponding to the number of each communication packet which is counted for all the combination of the origination address and the destination address on the basis of the information of each communication packet which is received from the segment 3. FIG. 12A shows, for example, the communication frequency information 160 which is generated by the communication frequency information generation unit 116 of the event extraction apparatus 10b (#1) connected to the segment 3 (#1) (see FIG. 10). FIG. 12A shows, for example, that the communication packets which are transmitted from the control apparatus 2 having the origination address "192.168.10.1" to the control apparatus 2 having the destination address "192.168.10.2" are detected 1200 times, and the communication packets which are transmitted from the control apparatus 2 having the origination address "192.168.10.1" to the control apparatus 2 having the destination address "192.168.10.3" are detected 250 times. FIG. 12B shows, for example, the communication frequency information 160 which is generated by the communication frequency information generation unit 116 of the event extraction apparatus 10b (#2) connected to the segment 3 (#2) (see FIG. 10). The communication between the same addresses is out of count target, and they are indicated by "-" in FIGS. 12A, 12B.

The communication frequency information generation unit 116 of the event extraction apparatus 10b generates the communication frequency information 160 shown in FIGS. 12A, 12B based on the information of the communication packets which are received from the segment 3, and transmits the communication frequency information 160 to the monitoring apparatus 20b. The transmission of the communication frequency information 160 to the monitoring apparatus 20b by the event extraction apparatus 10b is performed before the security monitoring system 100b performs monitoring on the unauthorized access and the like of the control system 1 (before the full-scale operation of the control system 1).

(Monitoring Apparatus)

Figure 13:
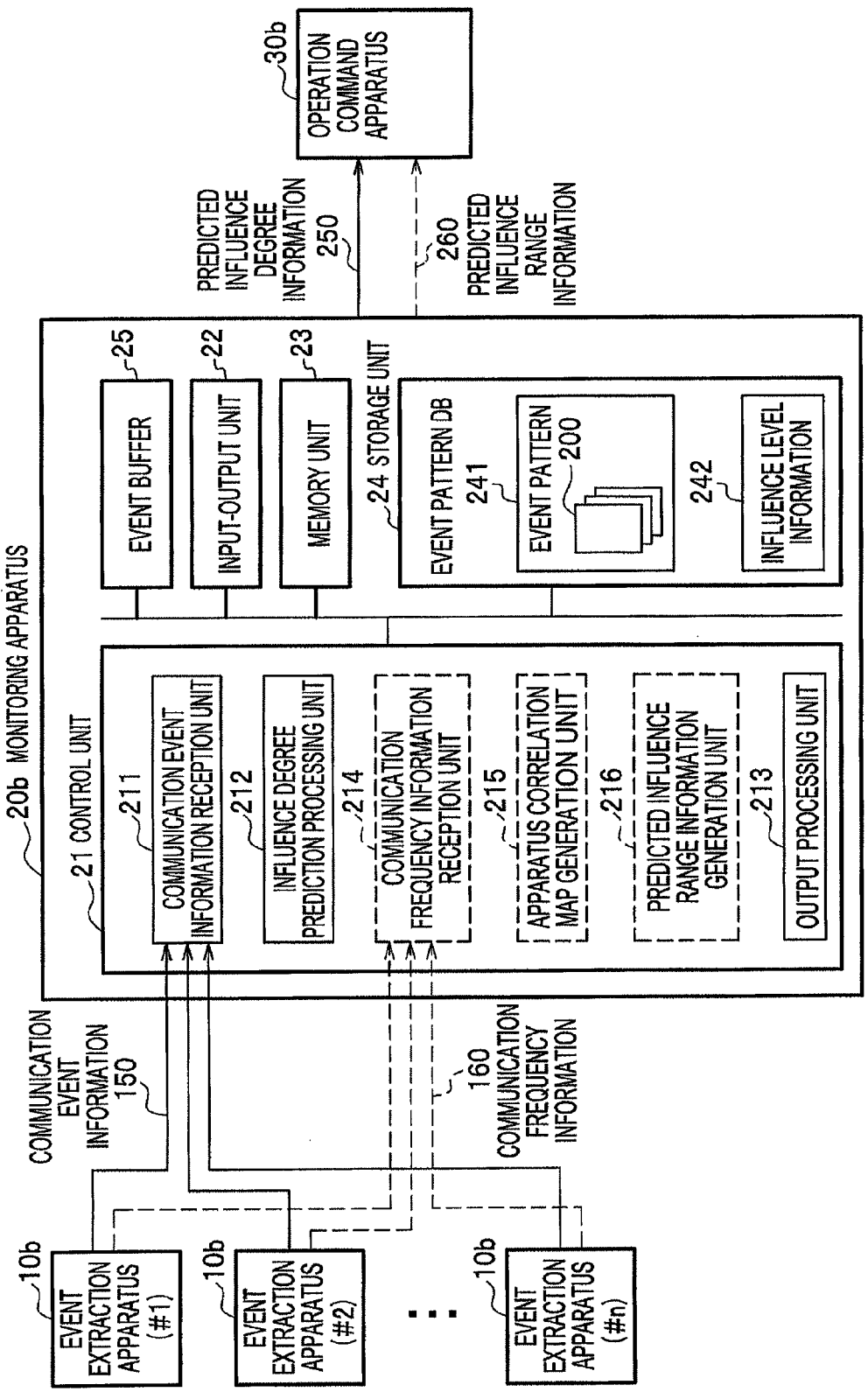
FIG. 13 is a functional block diagram showing a configuration example of a monitoring apparatus according to the second embodiment of the present invention.

FIG. 13 is a functional block diagram showing a configuration example of the monitoring apparatus 20b according to the second embodiment of the present invention. The difference from the monitoring apparatus 20 (see FIG. 4) according to the first embodiment of the present invention is that the monitoring apparatus 20b includes a communication frequency information reception unit 214, an apparatus correlation map generation unit 215, and a predicted influence range information generation unit 216 as well as each configuration of the monitoring apparatus 20. Since other configurations are same as the monitoring apparatus 20 shown in FIG. 4, the explanation will be omitted.

The communication frequency information reception unit 214 obtains the communication frequency information 160 (see FIGS. 12A, 12B) from each event extraction apparatus 10b through the input-output unit 22, and passes the communication frequency information 160 to the apparatus correlation map generation unit 215.

The apparatus correlation map generation unit 215 generates the communication frequency information 160 which indicates the communication frequency of the whole control system 1 (hereinafter referred to as the "communication frequency information (whole) 160") by combining the communication frequency information 160 generated by each event extraction apparatus 10b.

FIG. 14 is a diagram showing an example of a data structure of the communication frequency information (whole) 160 according to the second embodiment of the present invention. FIG. 14 shows the example which combines the communication frequency information 160 shown in FIG. 12A and the communication frequency information 160 shown in FIG. 12B, as the communication frequency information (whole) 160.

The apparatus correlation map generation unit 215 which has generated the communication frequency information (whole) 160 generates the apparatus correlation map 210 by normalizing the communication frequency information (whole) 160. In this case, the normalization means a process for converting each component of the matrix to a certain range of manageable numerical values, and scaling or quantization is used, for example.

FIG. 15A and FIG. 15B are diagrams for explaining an example of a data structure of the apparatus correlation map 210 according to the second embodiment of the present invention. FIG. 15A shows the example which normalizes the communication frequency information (whole) 160 in FIG. 14 by using a logarithmic scale shown in FIG. 15B, as the apparatus correlation map 210. In the apparatus correlation map 210 of FIG. 15A, correlation values ("1" to "4": see FIG. 15B) of four stages (except the number of packets "0" not used for evaluating the correlation between the apparatuses) are calculated by the apparatus correlation map generation unit 215 in accordance with the number of the communication packets shown in FIG. 14. Here, the larger the number of the communication packets is, the stronger the correlation is (the higher correlation value is set). The apparatus correlation map 210 shown in FIG. 15A shows the correlation values which indicates how closely the information are transmitted and received between respective control systems 2 in the control system 1. The generation process of the apparatus correlation map 210 is performed by the apparatus correlation map generation unit 215 before the operation of monitoring on the unauthorized access and the like by the security monitoring system 100b. That is, the monitoring apparatus 20b receives the communication frequency information 160 from each event extraction apparatus 10b (see FIG. 11), and the apparatus correlation map 210 is generated in advance and stored in the memory unit 23 or the like by the apparatus correlation map generation unit 215.

The predicted influence range information generation unit 216 extracts the control apparatuses 2 on the spreading route by using the destination address included in the communication event information 150, when the communication event information reception unit 211 receives the communication event information 150 from each event extraction 10b during normal operation of the control system 1. Specifically, the predicted influence range information generation unit 216 extracts the control apparatuses 2 which have close relationship with the control apparatus 2 indicated by the destination address with reference to the apparatus correlation map 210 by using the destination address included in the communication event information 150. In other words, the predicted influence range information generation unit 216 sets the destination address included in the communication event information 150 to the origination address in the apparatus correlation map 210, and extracts the control apparatuses 2 on the spreading route by extracting the destination address which has a correlation value larger than or equal to a predetermined threshold value in the record. Hereinafter, a specific example will be explained with reference to FIGS. 16A, 16B.

Figure 16A:
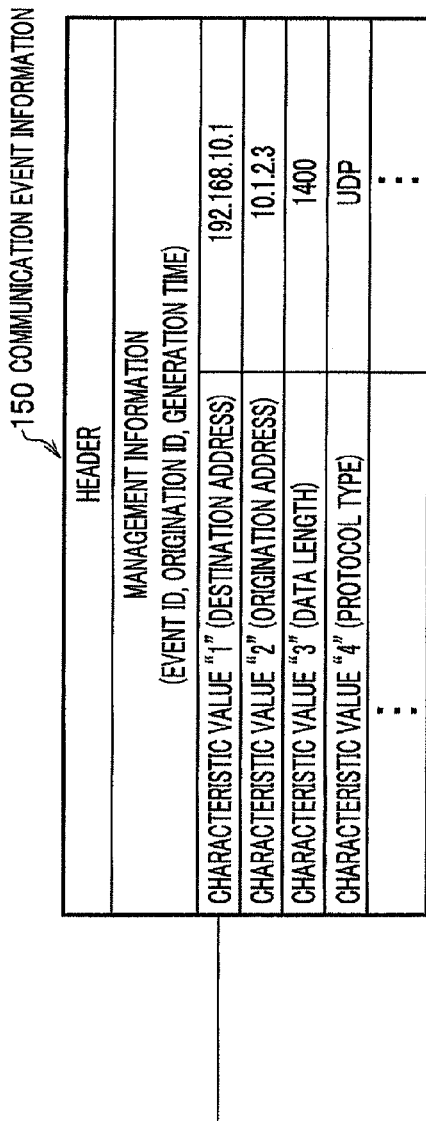
FIG. 16A and FIG. 16B are diagrams for explaining a generation process of predicted influence range information performed by a predicted influence range information generation unit according to the second embodiment of the present invention.
Figure 16B:
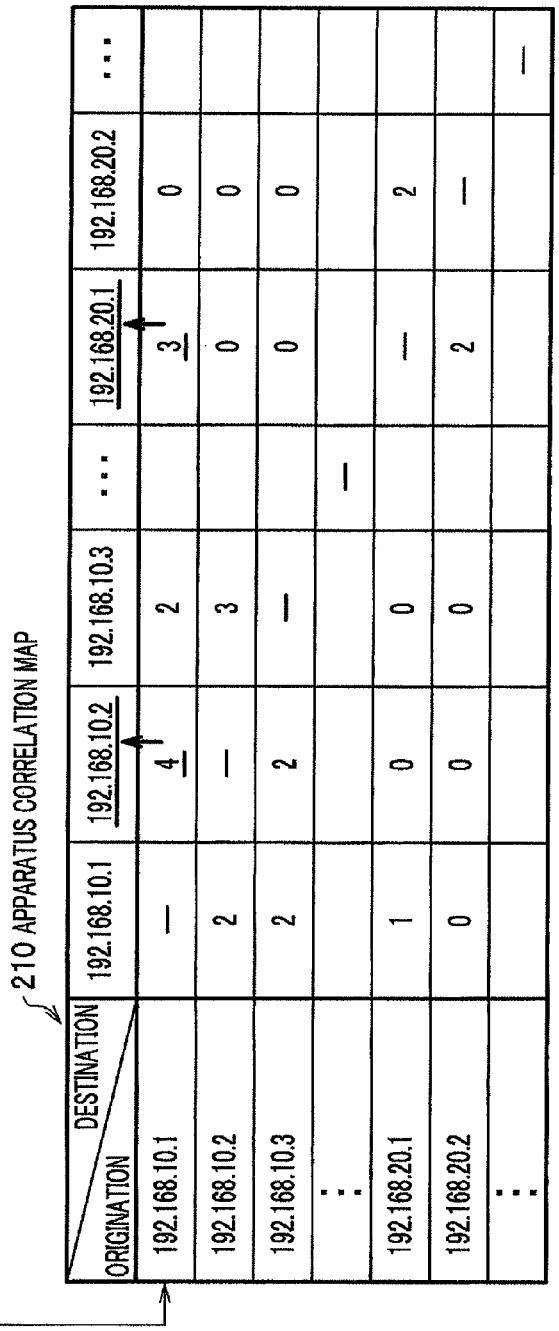

FIG. 16A and FIG. 16B are diagrams for explaining a generation process of the predicted influence range information 260 performed by the predicted influence range information generation unit 216 according to the second embodiment of the present invention. As shown in FIG. 16, the predicted influence range information generation unit 216 obtains at first the communication event information 150, and extracts the destination address ("192.168.10.1"). Then, the predicted influence range information generation unit 216 sets the extracted destination address to the origination address of the apparatus correlation map 210, and extracts the destination addresses (in this case, "192.168.10.2" and "192.168.20.1") which have correlation values larger than or equal to a predetermined threshold value (which is "3" in this case) in the record.

In this manner, the predicted influence range information generation unit 216 extracts the control apparatuses 2 (in this case, the control apparatuses 2 having the addresses "192.168.10.2" and "192.168.20.1") which has high possibility to be affected by the unauthorized access and the like by the communication packet extracted as the communication event information 150 by using the destination address of the communication event information 150, and generates the predicted influence range information 260 including the addresses to transmit the predicted influence range information 260 to the operation command apparatus 30b through the output processing unit 213.

The predicted influence range information generation unit 216 further sets the extracted address to the origination address of the apparatus correlation map 210, and extracts the destination addresses which have correlation values larger than or equal to the predetermined threshold value in the record. The predicted influence range information generation unit 216 may repeat the process to predict the spreading routes, until the destination address which has the correlation value larger than or equal to the predetermined threshold value is not extracted. In the example of FIGS. 16A, 16B, the predicted influence range information generation unit 216 sets the extracted destination addresses "192.168.10.2" and "192.168.20.1" to the origination addresses of the apparatus correlation map 210 respectively, and extracts the destination address (in this case, "192.168.10.3") which has the correlation value larger than or equal to the predetermined threshold value (which is "3" in this case) in the record of the origination address "192.168.10.2", and then further continues the process. On the other hand, as for the record of the origination address "192.168.20.1", the predicted influence range information generation unit 216 terminates the prediction of the spreading route, since there is no destination address which has the correlation value larger than or equal to the predetermined threshold value (which is "3" in this case). Then, the predicted influence range information generation unit 216 generates the predicted influence range information 260 which includes the addresses of each control apparatus 2 on the spreading route, and transmits the predicted influence range information 260 to the operation command apparatus 30b.

(Operation Command Apparatus)

FIG. 17 is a functional block diagram showing a configuration example of the operation command apparatus 30b according to the second embodiment of the present invention. The difference from the operation command apparatus 30 (see FIG. 6) according to the first embodiment of the present invention is that the operation command apparatus 30b includes a predicted influence range information reception unit 314, a priority command unit 315, and an output buffer 35 as well as each configuration of the operation command apparatus 30. Since other configurations are same as the operation command apparatus 30 shown in FIG. 6, the explanation will be omitted. The operation command apparatus 30b stores in the output buffer 35 the operation command information 350 which is generated by the operation command information generation unit 312, on the basis of the received predicted influence degree information 250. Then, the operation command apparatus 30b controls the output order of the operation command information 350 which is stored in the output buffer 35 so that the operation command apparatus 30b can transmit the operation command information 350 on a priority basis to the control apparatuses 2 which are predicted to have the strong correlation between the apparatuses on the basis of the predicted influence range information 260 by the priority command unit 315.

The buffer 35 is made of a storage unit such as a RAM, and stores the operation command information 350 which is generated by the operation command information generation unit 312, in the order in which the output processing unit 313 transmits the operation command information 350 to each control apparatus 2 of the control system 1.

The predicted influence range information reception unit 314 obtains the predicted influence range information 260 from the monitoring apparatus 20b through the input-output unit 32, and passes the predicted influence range information 260 to the priority command unit 315.

The priority command unit 315 controls the output buffer 35 so that the operation command information 350 for the control apparatus 2 which is predicted to have a strong correlation between the apparatuses indicated by the predicted influence range information 260 can be transmitted on a priority basis. Specifically, the priority command unit 315 sorts the operation command information 350 so that the operation command information 350 for the control apparatus 2 which is predicted to have a strong correlation between apparatuses can be arranged at the beginning of the output buffer 35, or divides the output buffer 35 into two buffers of a normal buffer and a prioritized buffer to store in the prioritized buffer the operation command information 350 for the control apparatus 2 which is predicted to have a strong correlation between apparatuses.

In this manner, the operation command apparatus 30b is able to transmit the operation command information 350 on a priority basis to the control apparatus 2 which is predicted to have a high possibility to be affected by the unauthorized access and the like by the communication packet which is extracted as the communication event information 150, and a quick operation is possible.

MODIFIED EXAMPLE

Next, a modified example of the security monitoring system 100b according to the present embodiment will be explained.

In the security monitoring system 100 according to the first embodiment and the security monitoring system 100b according to the second embodiment of the present invention, the respective event extraction apparatuses 10, 10b (#1 to #n) are the plurality of apparatuses which are provided corresponding to the respective segments 3 (#1 to #n) in the control system 1 (see FIG. 1 and FIG. 10). However, the present invention is not limited to these embodiments, the event extraction apparatuses 10, 10b may be configured in one apparatus to be connected to the respective segments 3 (#1 to #n). In addition, the extraction apparatuses 10, 10b, the monitoring apparatuses 20, 20b, and the operation command apparatuses 30, 30b may be configured in any combination, respectively, or may be configured in one apparatus which has functions of the respective apparatuses.

In the event extraction apparatus 10 (see FIG. 2) according to the first embodiment of the present invention, the data structure of the communication event information 150 (see FIG. 3) generated by the communication event information generation unit 114 is configured to include the header 151, the management information 152, and the characteristic values 153 to 156. However the present invention is not limited to this embodiment, the event extraction apparatus 10 may transmit to the monitoring apparatus 20 the communication event information 150 including each condition of the characteristic value determination information 120 which determines whether or not each of the characteristic values 153 to 156 is different from the normal value. In this manner, the characteristic values 153 to 156 and each condition of the characteristic value determination information 120 can be displayed in combination as the communication event information 150 on an output apparatus such as a monitor which is connected to the monitoring apparatus 20.

REFERENCE SIGNS LIST

1: control system
2: control apparatus
3: segment
10, 10b: event extraction apparatus (event extraction unit)
11, 21, 31: control unit
12, 22, 32: input-output unit
13, 23, 33: memory unit
14, 24, 34: storage unit
20, 20b: monitoring apparatus (monitoring unit)
25: event buffer
30, 30b: operation command apparatus (operation command unit)
35: output buffer 100, 100b: security monitoring system
110: learned value information
111: packet reception unit
112: learned value information generation unit
113: communication event extraction unit
114: communication event information generation unit
115, 213, 313: output processing unit
116: communication frequency information generation unit
120: characteristic value determination information
150: communication event information
160: communication frequency information
200: event pattern
210: apparatus correlation map
211: communication event information reception unit
212: influence degree prediction processing unit
214: communication frequency information reception unit
215: apparatus correlation map generation unit
216: predicted influence range information generation unit
241: event pattern DB
242: influence level information
250: predicted influence degree information
260: predicted influence range information
300: "influence level to operation command" conversion information
311: predicted influence degree information reception unit
312: operation command information generation unit
314: predicted influence range information reception unit
315: priority command unit
350: operation command information

The invention claimed is:

1. A security monitoring system for detecting an abnormality of a control system provided with one or more segments having one or more control apparatuses, the security monitoring system comprising:
   a processor;
   a memory storing computer instructions that when executed cause the processor to operate;
   an event extraction software unit; and
   a monitoring software unit, wherein
   the event extraction software unit comprises:
      a packet reception software unit for obtaining communication packets transmitted and received in a segment;
      a communication event extraction software unit for extracting a communication packet having a characteristic value different from that of an average characteristic value of the obtained communication packets, the characteristic value being information commonly attached to the communication packets; and
      a communication event information generation software unit for generating communication event information attached with the characteristic value of the extracted communication packet to transmit the communication event information to the monitoring software unit, and
   the monitoring software unit comprises:
   a storage unit for storing one or more event patterns defining unauthorized accesses by a combination of conditions set for each communication packet, the conditions being set to characterize each communication packet constituting a series of the unauthorized communication packets for each unauthorized access of the control system by transmitting the series of unauthorized communication packets, and storing influence level information having influence levels indicating degrees of influence on the control system, the influence levels being associated with each unauthorized access defined by the event pattern; and
      an influence degree prediction processing software unit for verifying the characteristic values of the communication packet attached to the received communication event information with the conditions set for each of the event patterns for each communication packet, to detect the event pattern similar to the communication packet, wherein
   in response to a determination that an event pattern similar to the communication packet exists, the influence level of the detected event pattern is determined with reference to the influence level information, and
   in response to a determination that an event pattern similar to the communication packet does not exist, an early warning level is determined as the influence level.

2. The security monitoring system as set forth in claim 1, further comprising an operation command software unit,
   the influence degree prediction processing software unit of the monitoring software unit generating predicted influence degree information attached with the determined influence level to transmit the predicted influence degree information to the operation command software unit,
   the operation command software unit comprising:
      a storage software unit for storing influence level to operation command conversion information in which a process to be performed by the control system for the unauthorized access is stored as the operation command corresponding to the influence level,
      an operation command information generation software unit for determining the operation command for the unauthorized access with reference to the influence level to operation command conversion information on the basis of the influence level indicated by the received predicted influence degree information, to generate the operation command information attached with the determined operation command; and
      an output processing software unit for transmitting the generated operation command information to the control system.

3. The security monitoring system as set forth in claim 2, the event extraction software unit further comprising a communication frequency information generation software unit for receiving the communication packets in the control system during operation through the packet reception software unit, to generate communication frequency information detecting the number of the communication packets whose origination and destination are the control apparatuses in the segment for each combination of the control apparatus as the origination of the communication packet and the control apparatus as the destination of the communication packet, and to transmit the generated communication frequency information to the monitoring software unit before the monitoring software unit starts monitoring for detecting the abnormality of the control system,
   the monitoring software unit further comprising:
      an apparatus correlation map generation software unit for generating an apparatus correlation map having a correlation value indicating that the correlation is strong if the number of the communication packets between the apparatus as the origination and the apparatus as the destination is many, the number of the communication packets being shown in the received communication frequency information, the correlation value being calculated for each combination of the control apparatus as the origination of the communication packet and the control apparatus as the destination of the communication packet; and a predicted influence range information generation software unit for obtaining the control apparatus indicated by the destination address contained in the received communication event information, to extract the destination control apparatuses having the correlation values larger than or equal to a predetermined value when the obtained control apparatus is set as the origination control apparatus indicated by the apparatus correlation map, to generate the predicted influence range information including the address of the extracted destination control apparatus, and to transmit the predicted influence range information to the operation command software unit, and the operation command software unit further comprising:
 an output buffer for storing the operation command information generated by the operation command information generation software unit; and
 a priority command software unit for controlling the order of the transmission of the operation command information in the output buffer so that the operation command information to the control apparatuses indicated by the addresses included in the received predicted influence range information can be transmitted on a priority basis.

4. A security monitoring method of a security monitoring system for detecting an abnormality of a control system provided with one or more segments having one or more control apparatuses, the security monitoring system comprising a processor, a memory storing computer instructions that when executed cause the processor to operate, an event extraction software unit, and a monitoring software unit, the method comprising:
 obtaining communication packets transmitted and received in the segments;
 extracting communication packet having a characteristic value different from that of an average characteristic value of the obtained communication packets, the characteristic value being information commonly attached to the communication packets;
 generating communication event information attached with the characteristic value of the extracted communication packet to transmit the communication event information to the monitoring software unit, the monitoring software unit comprising a storage software unit, by setting a condition to characterize each communication packet constituting the series of the unauthorized communication packets for each unauthorized access of the control system by transmitting a series of unauthorized communication packets, and one or more event patterns defining the unauthorized access by a combination of the conditions set for each communication packet are stored in the storage software unit, while influence level information stored with influence levels indicating degrees of influence on the control system corresponding to each unauthorized access defined by the event pattern is stored in the storage software unit;
 verifying the characteristic value of the communication packet attached to the received communication event information with the conditions set for each of the event patterns for each communication packet; and
 detecting the event pattern similar to the communication packet, wherein
  in response to a determination that the event pattern similar to the communication packet exists, the influence level of the detected event pattern is determined with reference to the influence level information, and
  in response to a determination that an event pattern similar to the communication packet does not exist, an early warning level is determined as the influence level.

5. The security monitoring method as set forth in claim 4, the method further comprising:
performing by the monitoring software unit, a step to generate predicted influence degree information attached with the determined influence level to transmit the predicted influence degree information to an operation command software unit,
the operation command software unit comprising a storage software unit that stores influence level to operation command conversion information in which a process to be performed by the control system for the unauthorized access is stored as the operation command corresponding to the influence level, wherein
the operation command software unit further performs following steps of: determining the operation command for the unauthorized access with reference to the influence level to operation command conversion information on the basis of the influence level indicated by the received predicted influence degree information; generating the operation command information attached with the determined operation command; and
transmitting the generated operation command information to the control system.

6. The security monitoring method as set forth in claim 5, wherein the method further comprising:
receiving, by the event extraction software unit, the communication packets in the control system during operation; generating communication frequency information indicating the number of the communication packets, whose origination and destination are the control apparatuses in the segment, detected for each combination of the control apparatus as the origination of the communication packet and the control apparatus as the destination of the communication packet; and
transmitting the generated communication frequency information to the monitoring software unit before the monitoring software unit starts monitoring for detecting the abnormality of the control system,
the monitoring software unit further performing following steps of: generating an apparatus correlation map having a correlation value indicating that the correlation is strong if the number of the communication packets between the apparatus as the origination and the apparatus as the destination is many, the number of the communication packets being shown in the received communication frequency information, the correlation value being calculated for each combination of the control apparatus as the origination of the communication packet and the control apparatus as the destination of the communication packet;
obtaining the control apparatus indicated by the destination address contained in the received communication event information;
extracting the destination control apparatuses having the correlation values larger than or equal to a predetermined value when the obtained control apparatus is set as the origination control apparatus indicated by the apparatus correlation map;
generating the predicted influence range information including the address of the extracted destination control apparatus; and
transmitting the predicted influence range information to the operation command software unit, the operation command software unit further comprising an output buffer that stores the generated operation command information, performing by the operation command software unit a step to control the order of the transmission of the operation command information in the output buffer so that the operation command information to the control apparatuses indicated by the addresses included in the received predicted influence range information can be transmitted on a priority basis.

* * * * *